United States Patent [19]
Gibb

[11] 3,756,629
[45] Sept. 4, 1973

[54] STUD SYSTEM OF JOINING PIPE AND COUPLINGS FOR SAME

[75] Inventor: John Gibb, Bolton, Ontario, Canada

[73] Assignee: Victaulic Company of America, South Plainfield, N.J.

[22] Filed: Oct. 1, 1971

[21] Appl. No.: 185,505

[52] U.S. Cl............ 285/112, 29/471.1, 285/286, 285/367, 285/373, 285/416
[51] Int. Cl............................................. F16l 17/00
[58] Field of Search.................... 285/112, 286, 416, 285/373, 233, 363, 364, 365, 366, 367, 368, 405, 406, 407, 408, 409, 410, 411, 412, 413, 414, 415; 29/471.1, 471.3; 219/98, 99

[56] References Cited
UNITED STATES PATENTS

| | | | |
|---|---|---|---|
| 906,849 | 12/1908 | Booshuus...................... | 285/DIG. 7 |
| 3,601,995 | 8/1971 | Seiz............................. | 61/42 |
| 3,101,743 | 8/1963 | Hoke............................ | 285/37 UX |
| 1,143,321 | 6/1915 | Robinson...................... | 285/364 X |
| 2,775,685 | 12/1956 | Webster........................ | 219/99 |
| 2,879,084 | 3/1959 | Staiger......................... | 285/414 X |
| 2,962,305 | 11/1960 | McCarthy et al.............. | 285/416 X |
| 3,018,120 | 1/1962 | Vann............................ | 285/414 X |
| 3,433,509 | 3/1969 | Jeffery et al.................. | 285/416 X |
| 3,480,300 | 11/1969 | Jeffery et al.................. | 285/376 X |

FOREIGN PATENTS OR APPLICATIONS 587,512   4/1947   Great Britain...................... 285/368

Primary Examiner—Dave W. Arola
Attorney—Haffner, Jr., Brooks, Hardt, Delahunty & Mueller

[57] ABSTRACT

Radially projecting studs are secured around the outer circumference of pipes near the pipe ends by arc stud welding. Mechanical couplings receive the studs of opposed ends of adjacent pipe sections to join the pipe. The couplings may be formed in two or more arcuate parts which mate to form a complete ring, or stab-type couplings may be used, and suitable gaskets cooperate with the couplings to form pressure sealed joints.

19 Claims, 55 Drawing Figures

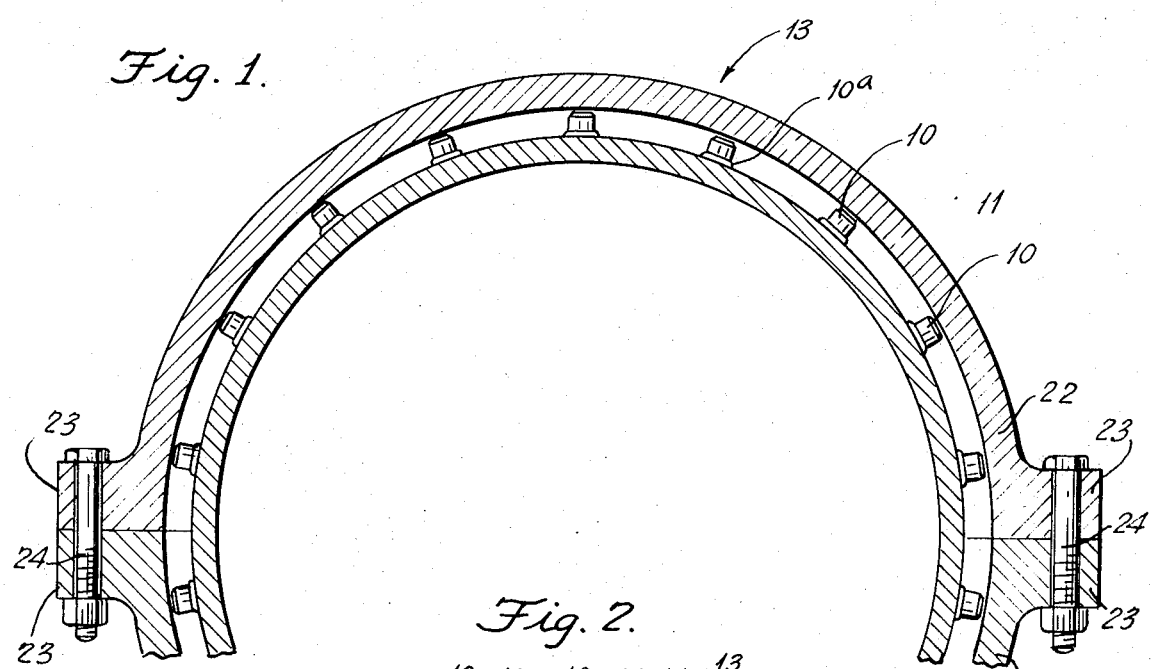
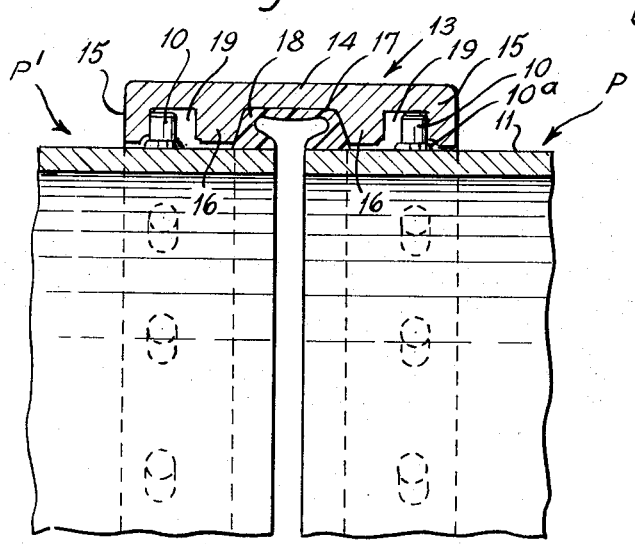
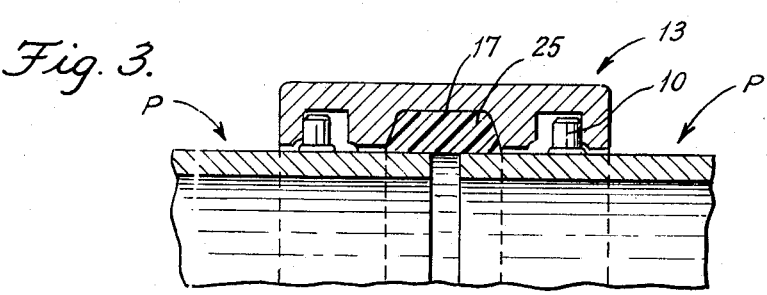
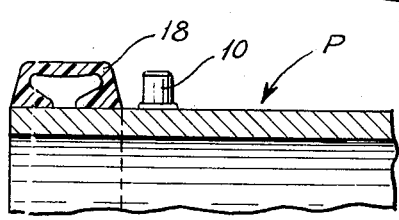

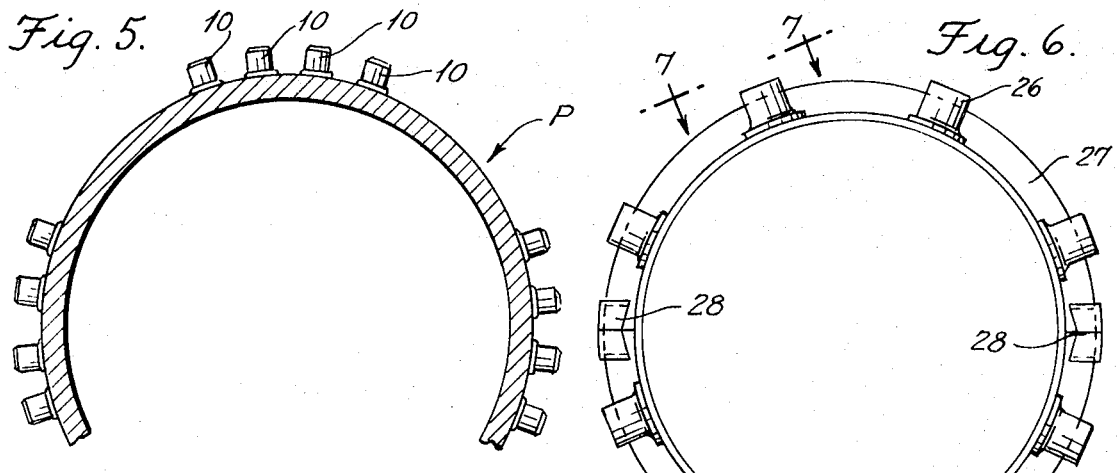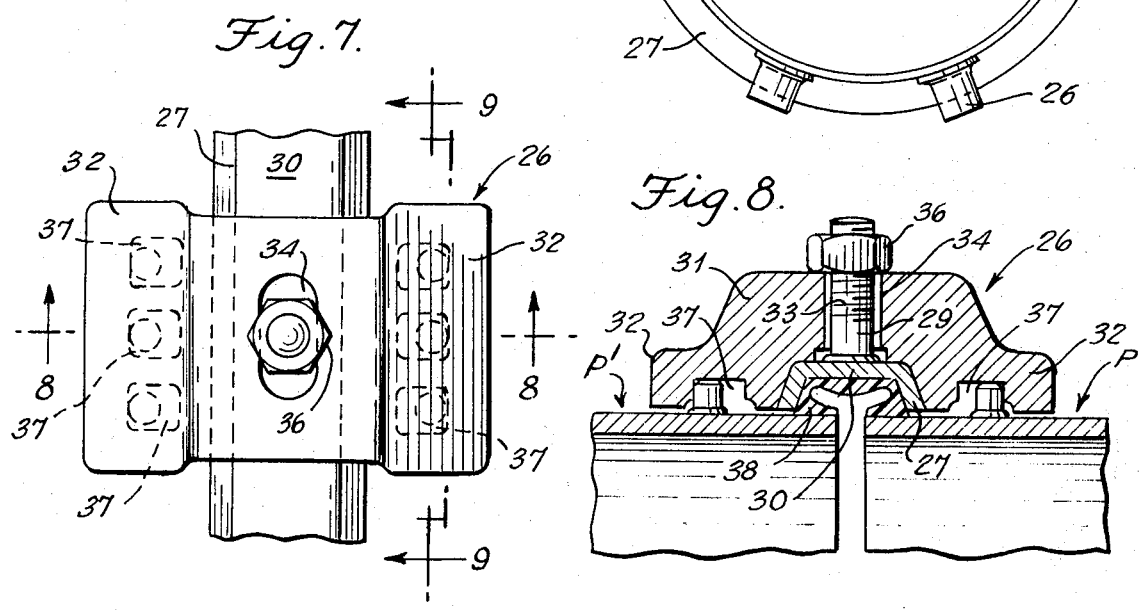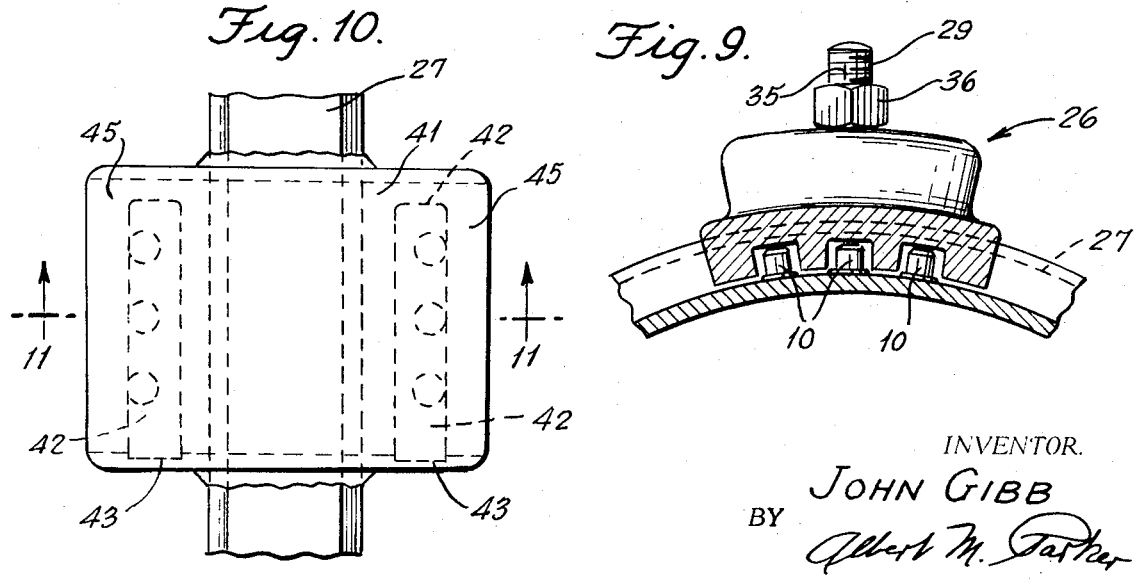

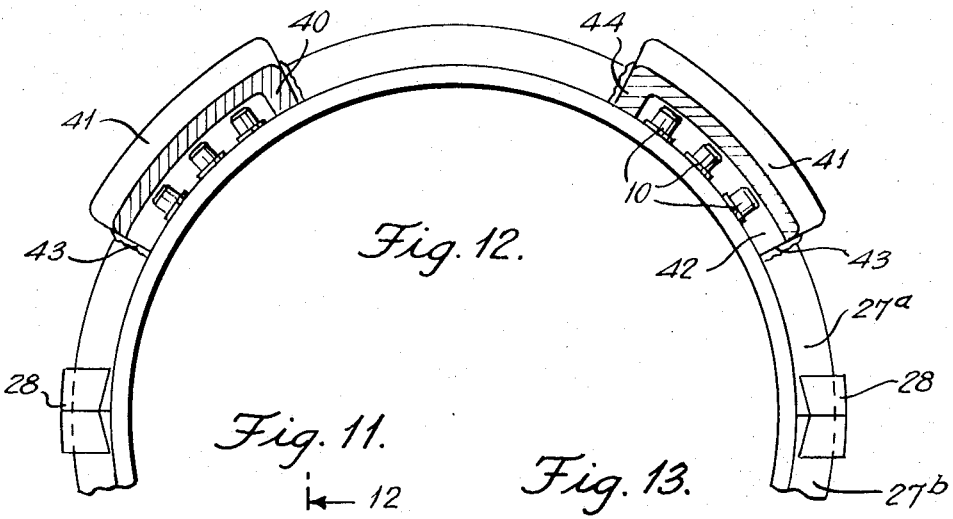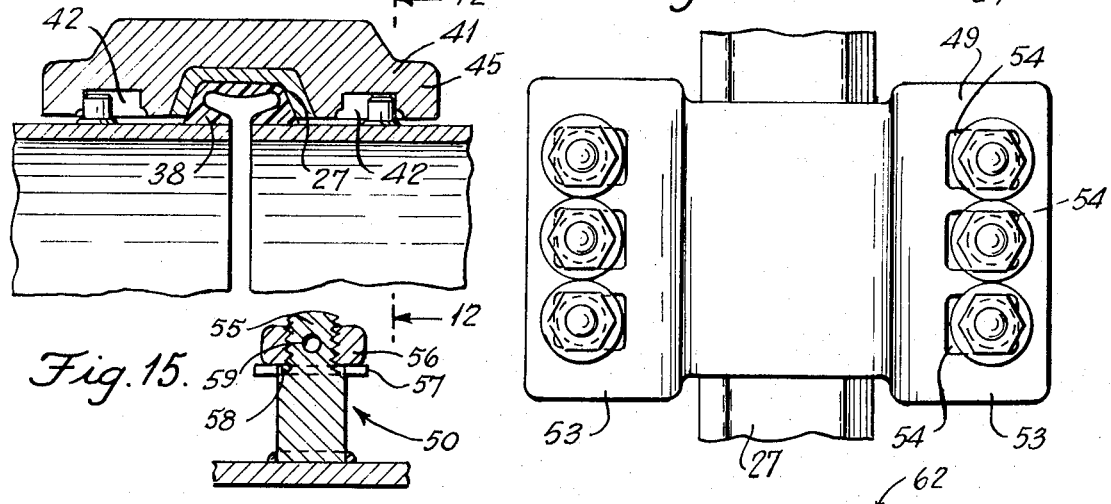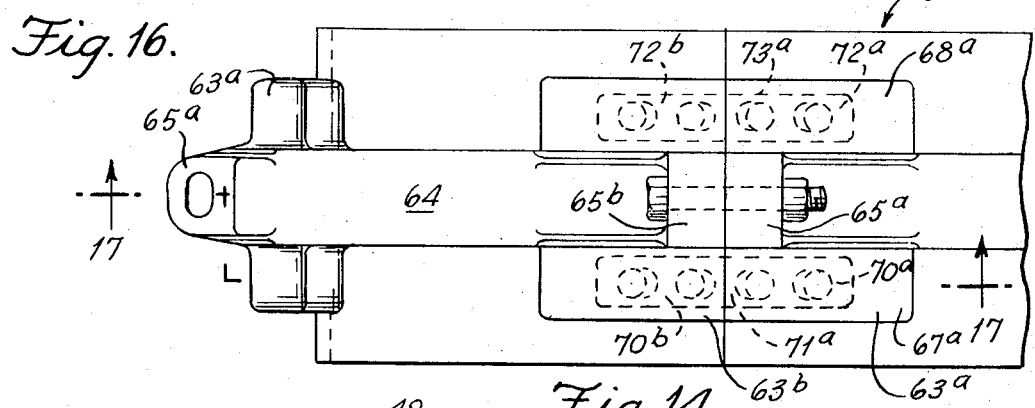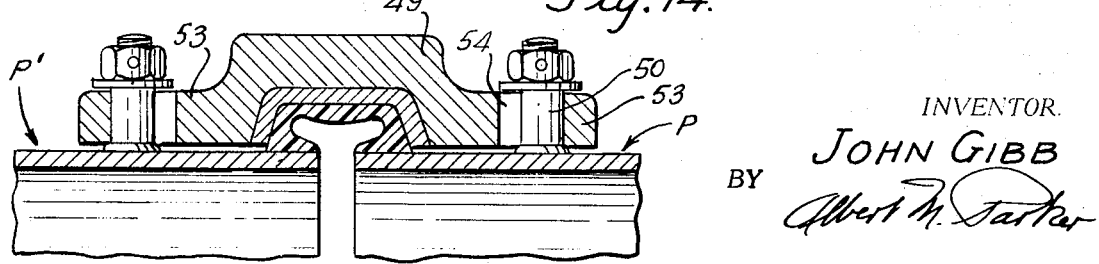

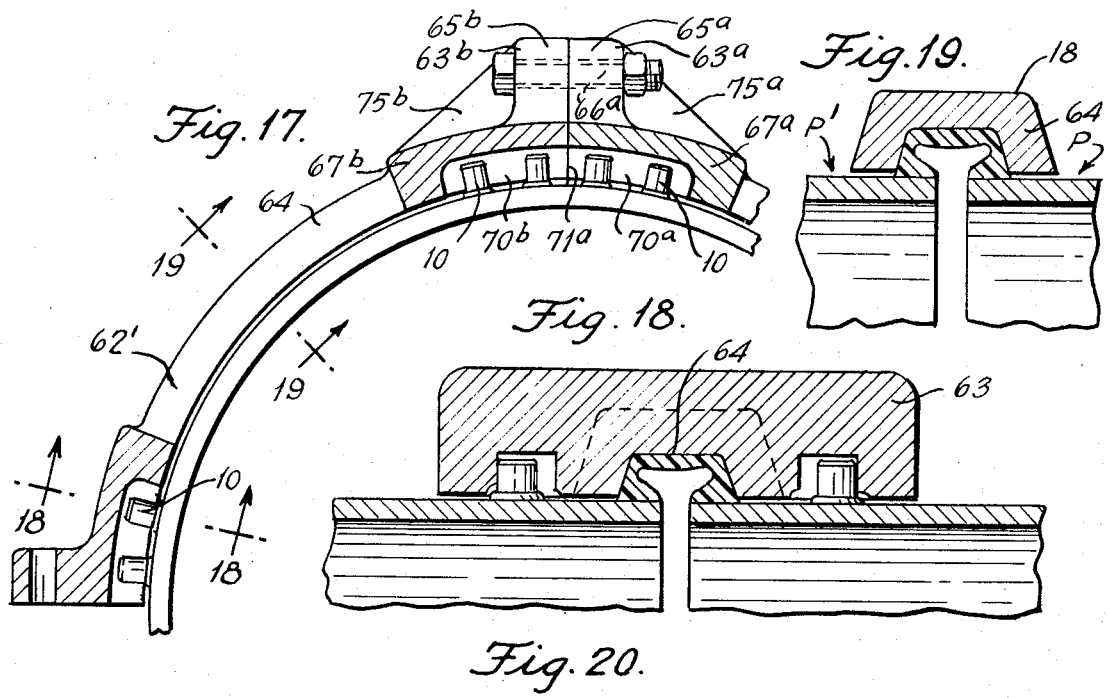
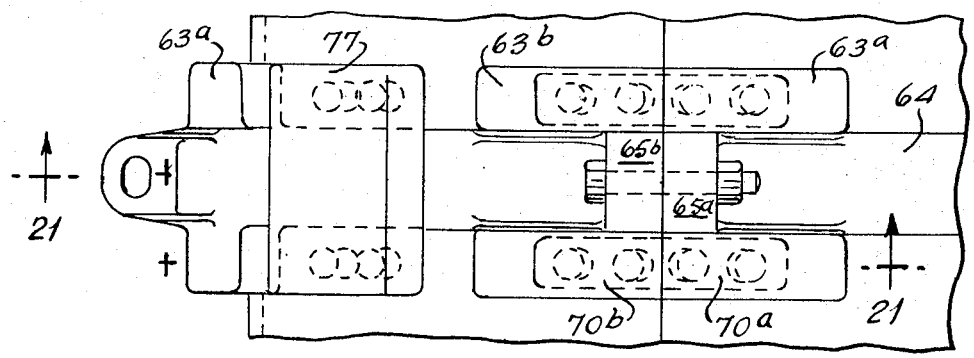
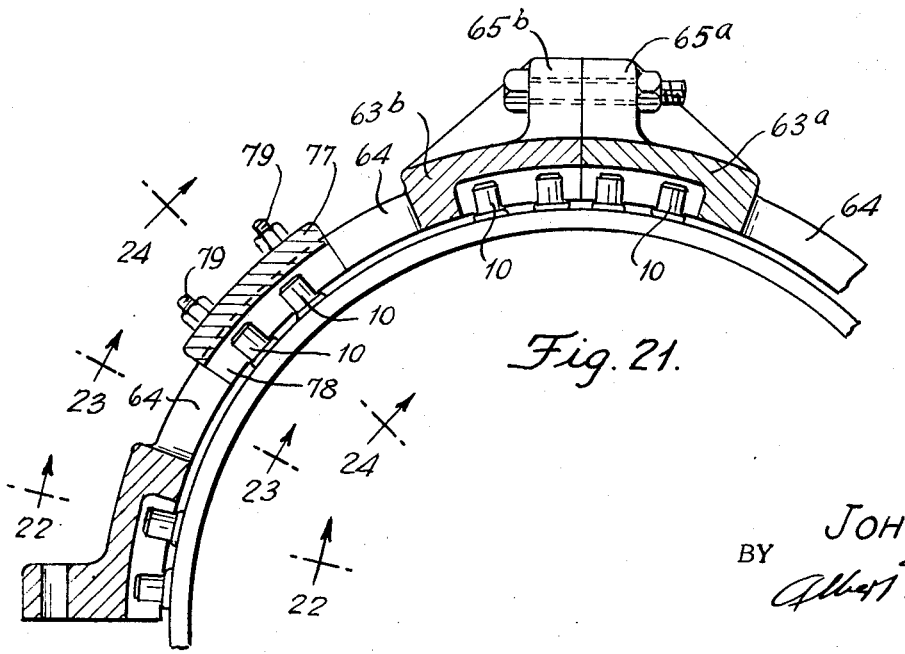

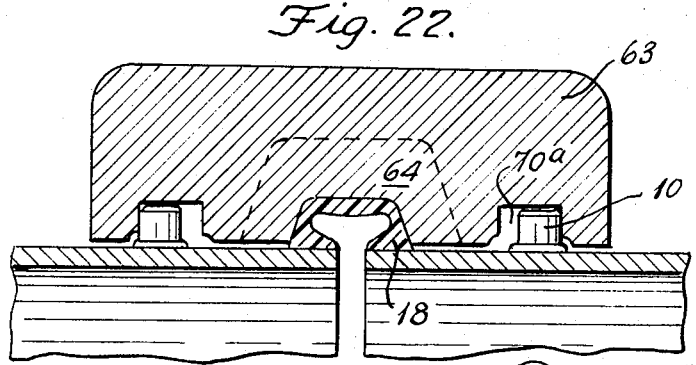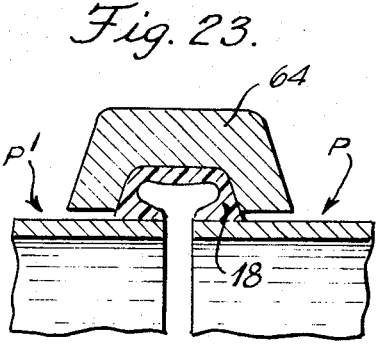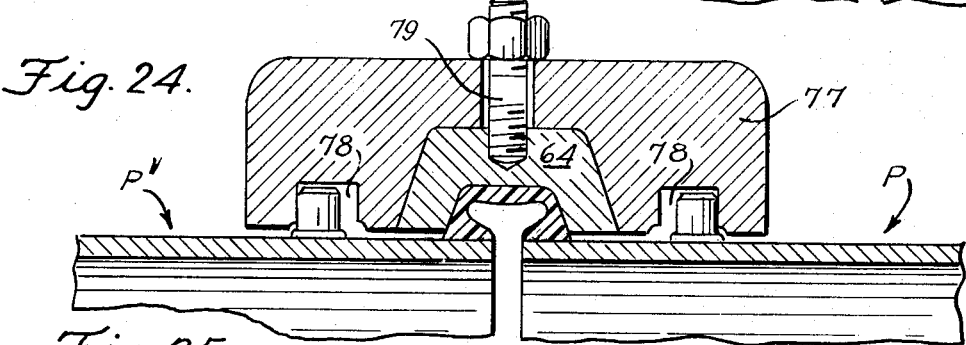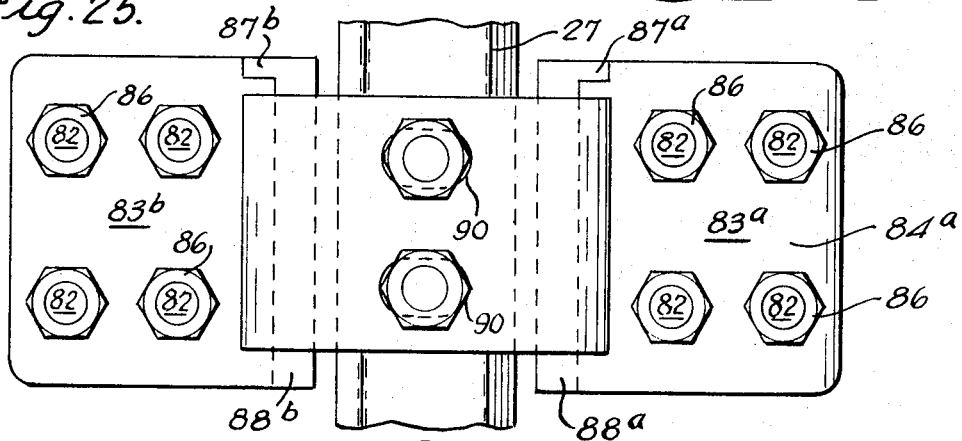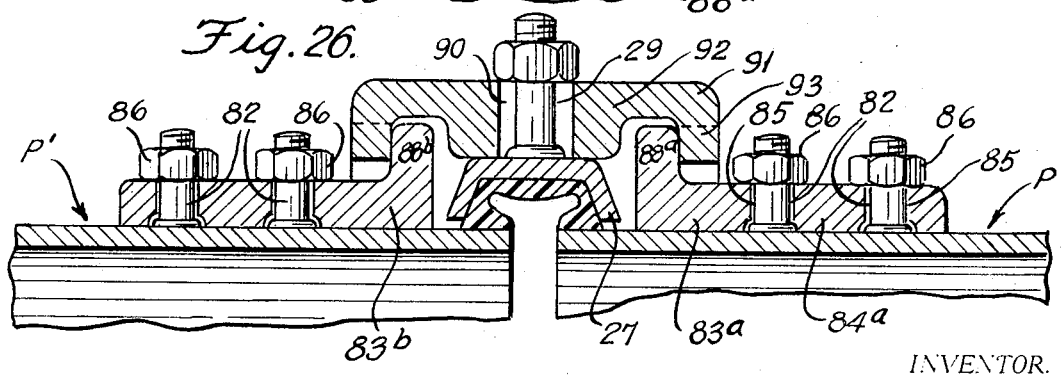

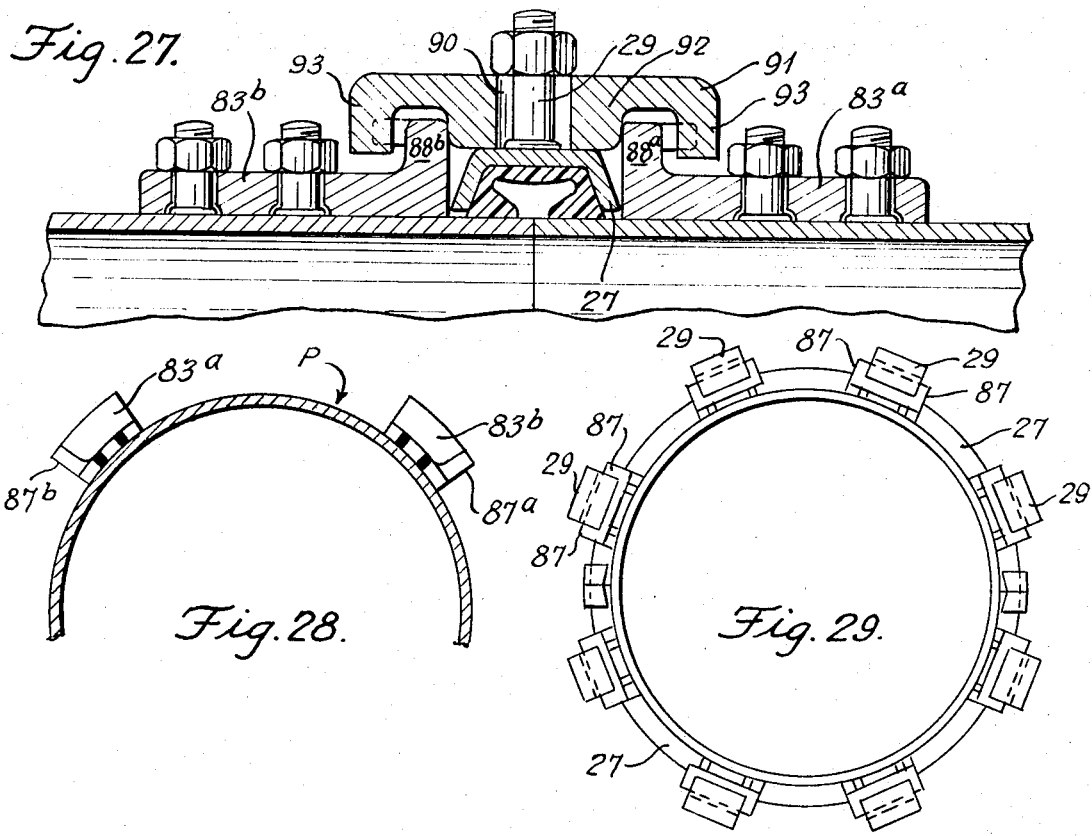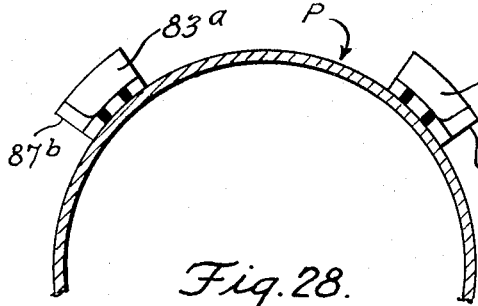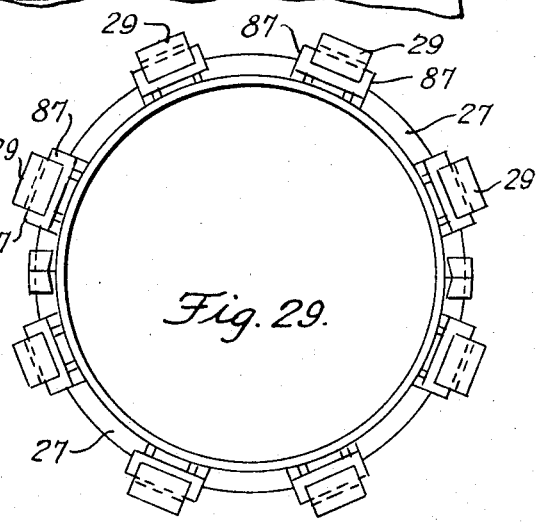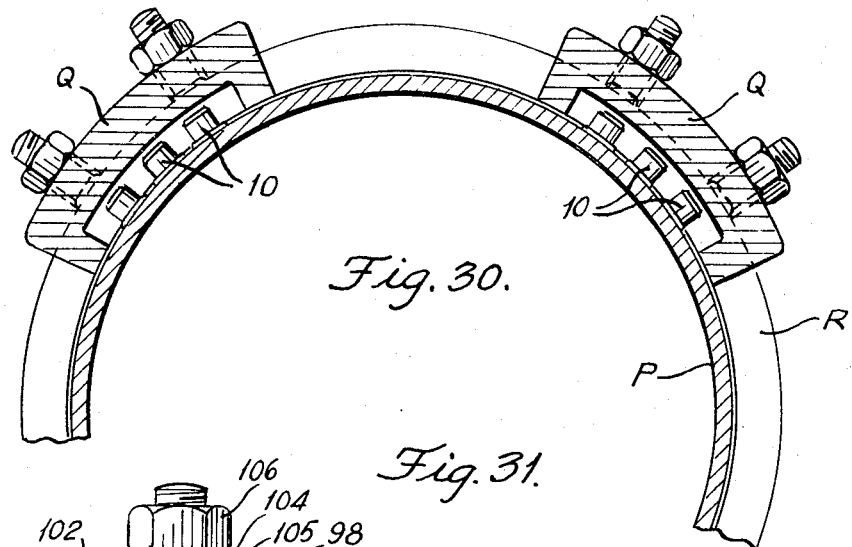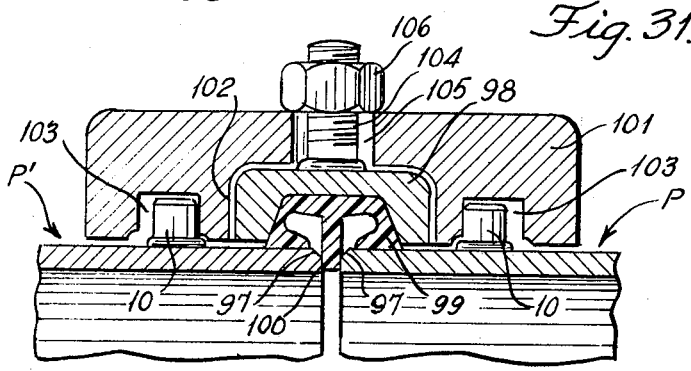

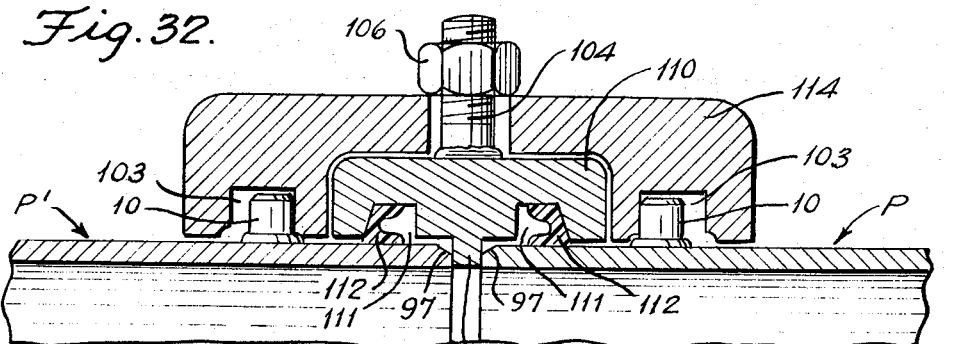
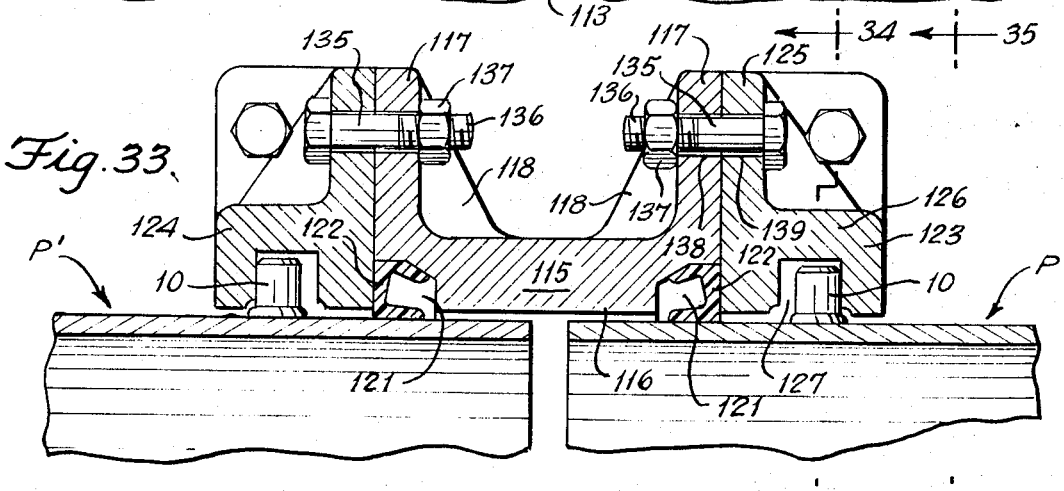
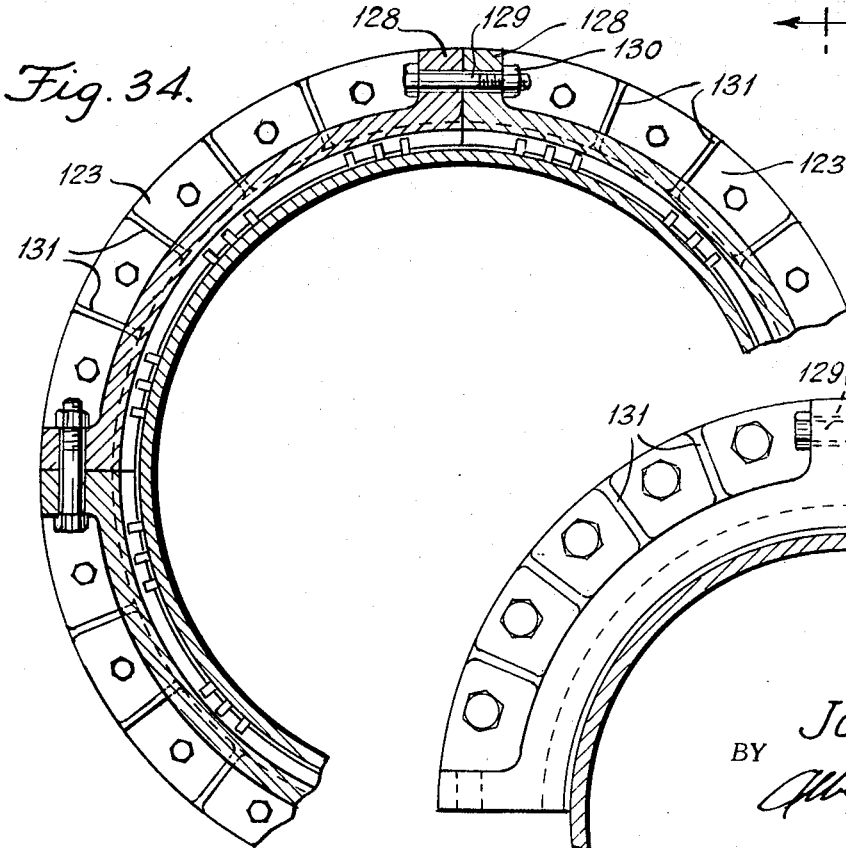
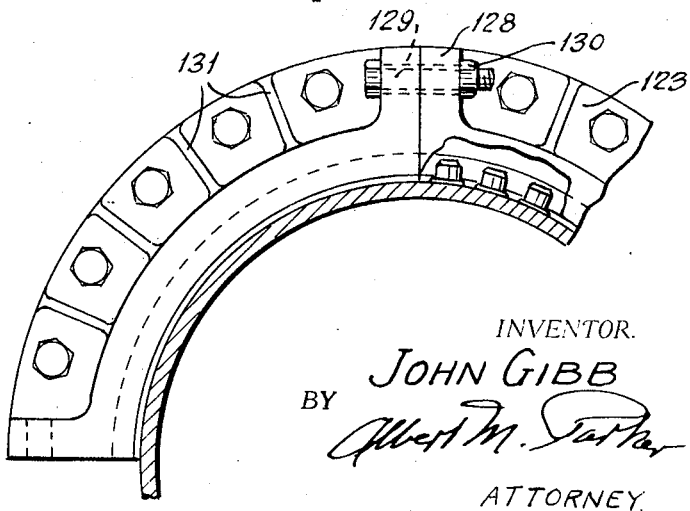

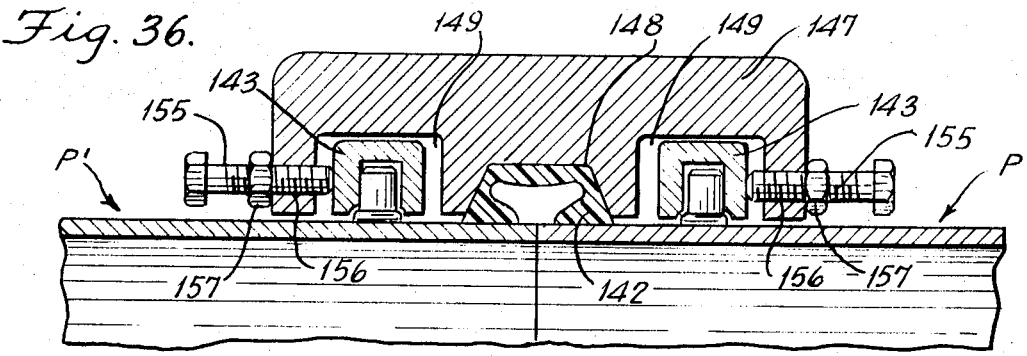
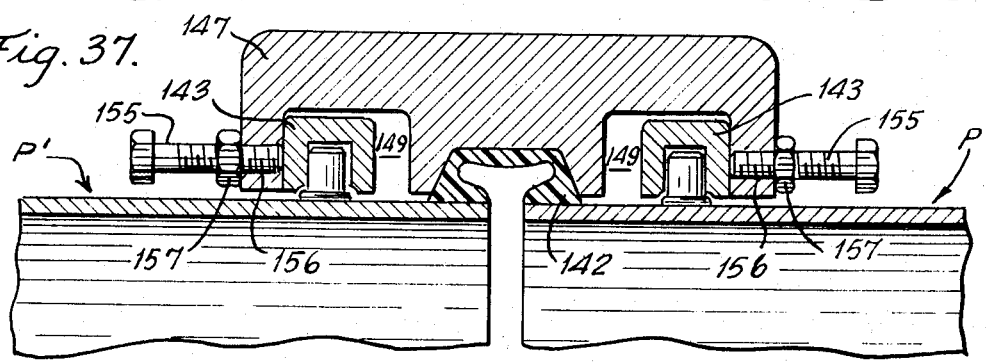
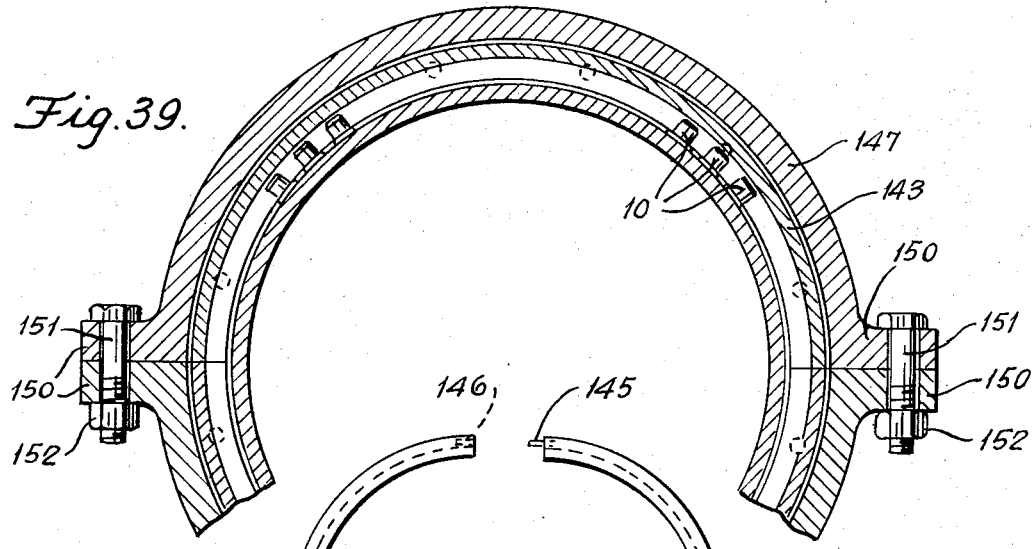
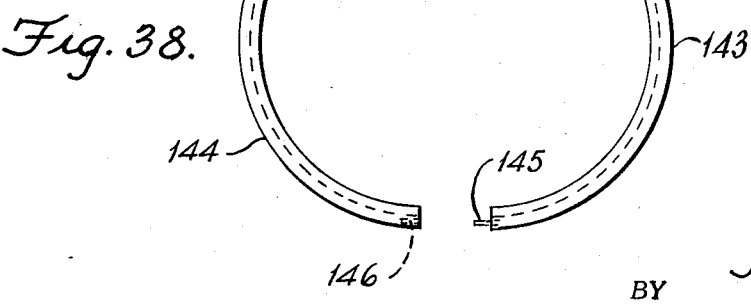

PATENTED SEP 4 1973 3,756,629

PIPE END LOADING FORCE

INVENTOR.
JOHN GIBB
BY
ATTORNEY.

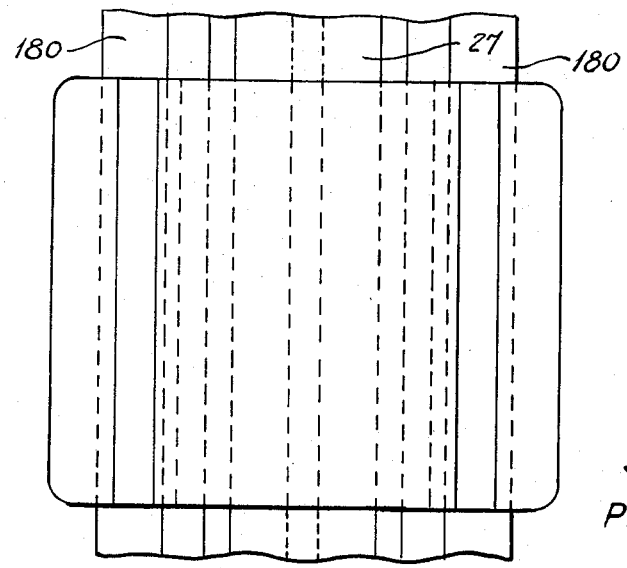
Fig. 47.
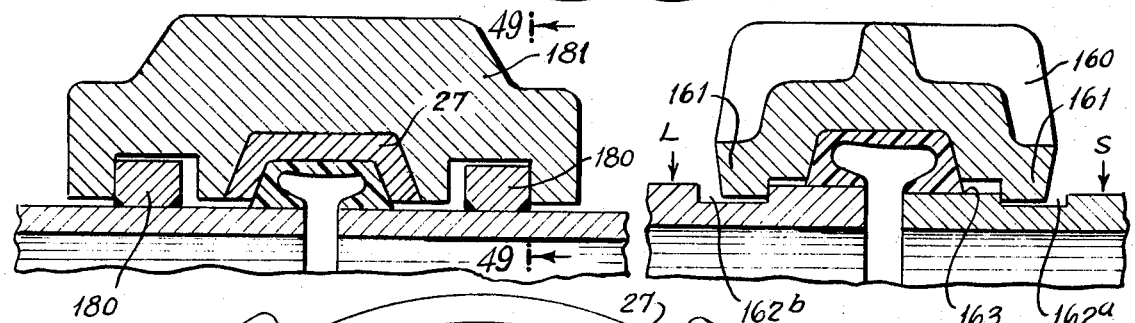
Fig. 48.
Fig. 50.
PRIOR ART
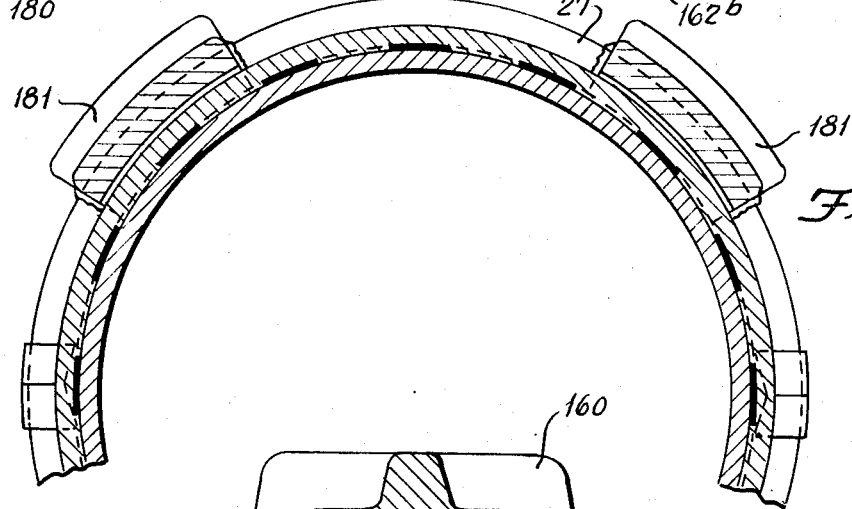
Fig. 49.
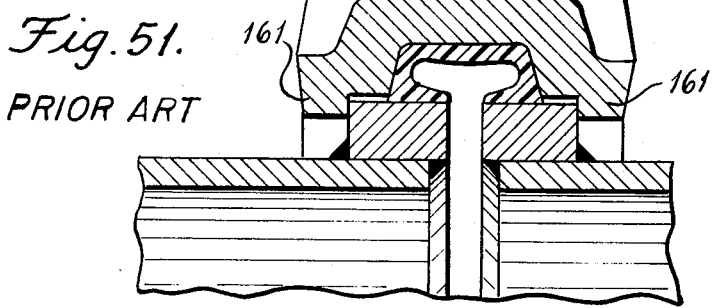
Fig. 51.
PRIOR ART
INVENTOR.
JOHN GIBB
BY
ATTORNEY.

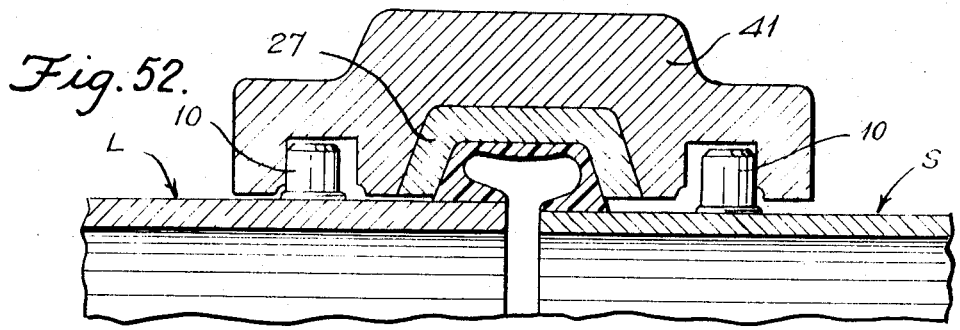
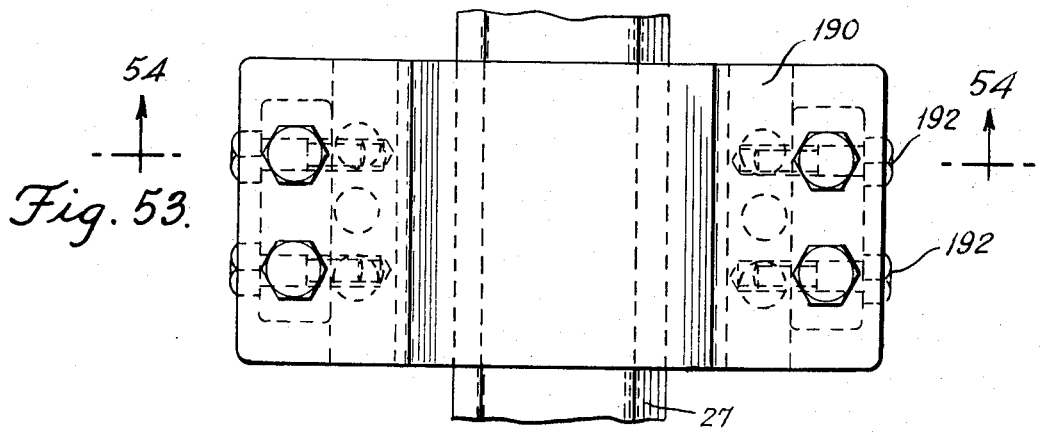
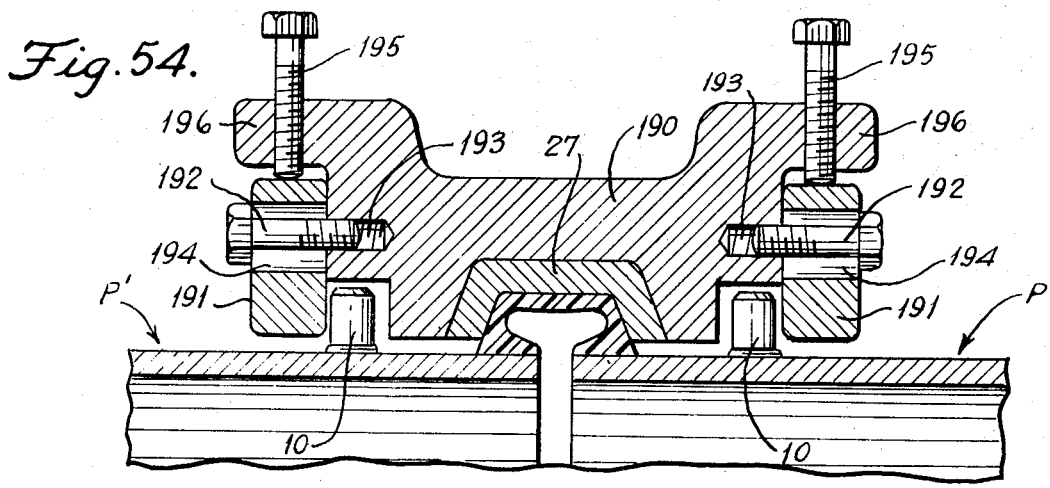
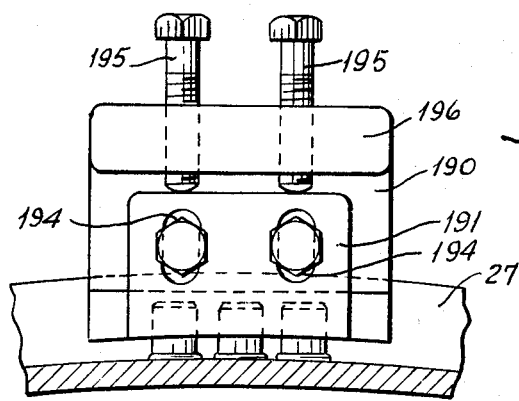

STUD SYSTEM OF JOINING PIPE AND COUPLINGS FOR SAME

BACKGROUND OF THE INVENTION

1. Field of the Invention

This invention relates to joining pipe sections end to end, and more particularly, to a system and method of forming pipe joints by welding studs at the ends of pipes and fitting couplings about the pipe ends to cooperate with the studs and to couplings adapted to receive such studs.

2. Description of the Prior Art

Various ways of joining pipe by means of mechanical couplings have been developed. The prior art methods of joining pipe conventionally require preparing the pipe by grooving, shouldering or upsetting of the pipe ends or by applying one of many kinds of known brackets, lugs or other fastening devices to the ends of the pipe to be connected. The pipes so prepared are then joined by means of couplings adapted to secure the pipe ends against separation and to seal the joint against leakage of the pipe's contents. The different prior art methods each have their own disadvantages. Grooving of pipe ends is limited by the size of the pipe and the availability of equipment. Pipes with grooves cut or rolled into them at the pipe ends are not suitable for some uses, particularly if corrosive or abrasive materials are to come into contact with the pipe. Shouldering of pipe ends is an expensive procedure and upsetting of pipe ends is a technique that is limited in application and limited by the size of pipe. Upsetting of pipe ends also requires special equipment. Other prior art practices have similar drawbacks.

SUMMARY OF THE INVENTION

This invention is based on the use of studs welded on to pipes by means of a stud welding process so that a mechanical coupling can be fitted around the ends of two pipe sections to cooperate with the studs, restraining the pipe ends against leakage of the contents to the outside or ingress of external medias Couplings between the pipes to which studs have been attached may, in accordance with the invention, provide for limited movement of the pipes in the longitudinal direction and/or angular movement. Rotational movement of one pipe with respect to another may be allowed for use of couplings adapted to permit such rotation. If desired, pipes can be joined to form a "rigid" connection which permits none of the movements just described.

Studs can be attached to pipe ends rapidly and economically by the arc stud welding technique with equipment which is commercially available. The application of the studs requires no special skills, and it is contemplated that the studs will be applied either in the field or at the pipe mill or fabrication shop. If the studs are not applied to the pipe on the site where the pipe is to be used, the studs will need protection against damage during shipment. In accordance with the method of the invention, studs may be attached at equally spaced locations around the circumference of a pipe end, or in some cases the studs may be arranged in spaced groups with several studs in each group. Suitable mechanical couplings for securing opposed pipe ends by engaging the studs may take any of several preferred forms, and in some cases the couplings may include separate bridge pieces overlying the pipe joint. Various embodiments of couplings adapted to connect pipes to which studs have been welded are disclosed to show the great versatility of the stud system of joining pipes. Most conventional types of couplings could readily be adaptable to use with studded pipes.

It is accordingly an object of the invention to provide a method of joining pipe which avoids the disadvantages of prior art practices. The method permits the easy joining of pipes which would normally be considered too thin to groove. The stud method of the invention may be used where rolling a groove into a pipe wall would be unacceptable, for example where the pipes are to carry abrasive substances which could erode through at the location of the groove, and where nonflexible coatings have been applied to the inside of the pipe and rolling a groove could cause the coating to crack or spall or where solids or abrasive pipe contents would attack such a coating at an uneven surface.

The method and means of the invention may be used to join pipes of equal outer diameter whether the pipes are of the same material or of different materials. As will become clear from the following detailed description, the invention will accomodate a good range in pipe outer diameter tolerances with appropriate couplings.

Other objects and advantages of the invention will appear more fully in the following detailed description, taken in conjunction with the accompanying drawings.

BRIEF DESCRIPTION OF THE DRAWINGS

FIG. 1 is an axial view in section of part of a pipe end and coupling according to the invention.

FIG. 2 is a longitudinal detail view in section of a pipe joint and coupling similar to the coupling of FIG. 1, with hidden parts shown by shadow lines.

FIG. 3 is a longitudinal detail view similar to that of FIG. 2 showing a modified form of gasket.

FIG. 4 is a detail sectional view showing the spacing of a stud from a pipe end to accomodate a gasket.

FIG. 5 is an axial view of part of a pipe end with studs arranged in groups.

FIG. 6 is an axial view of a pipe joint according to the invention with separate bridge pieces.

FIG. 7 is an expanded plan view taken along lines 7—7 of FIG. 6 and looking in the direction of the arrows.

FIG. 8 is a view in section of the elements shown in FIG. 7, taken along lines 8—8 and looking in the direction of the arrows.

FIG. 9 is a sectional view taken along lines 9—9 of FIG. 7 and looking in the direction of the arrows.

FIG. 10 is a plan detail view of a coupling according to the invention with hidden parts shown by shadow lines.

FIG. 11 is a sectional view of the coupling of FIG. 10 taken along lines 11—11 and looking in the direction of the arrows.

FIG. 12 is an axial view of part of a pipe joint with studs arranged as in FIGS. 10 and 11, taken in the direction indicated by lines 12—12 of FIG. 11 and looking in the direction of the arrows.

FIG. 13 is a detail plan view of a modified coupling according to the invention.

FIG. 14 is a view in section of the coupling of FIG. 13.

FIG. 15 is a detail view in section showing a stud adapted for use in connection with the coupling of FIGS. 13 and 14.

FIG. 16 is a partial plan view of a pipe joint with another type of coupling according to the invention.

FIG. 17 is an axial view taken along lines 17—17 of FIG. 16 and looking in the direction of the arrows.

FIG. 18 is a view in section taken along lines 18—18 of FIG. 17 and looking in the direction of the arrows.

FIG. 19 is a view in section taken along lines 19—19 of FIG. 17 and looking in the direction of the arrows.

FIG. 20 is a plan view similar to that of FIG. 16 showing another modified coupling according to the invention.

FIG. 21 is an axial view in section of the coupling of FIG. 20, taken along lines 21—21 and looking in the direction of the arrows.

FIG. 22 is a sectional view taken along lines 22—22 of FIG. 21 and looking in the direction of the arrows.

FIG. 23 is a view in section taken along lines 23—23 of FIG. 21 and looking in the direction of the arrows.

FIG. 24 is a sectional view taken along lines 24—24 of FIG. 21 and looking in the direction of the arrows.

FIG. 25 is a detail plan view of a coupling according to the invention which includes bracket pieces. Hidden structure is shown by shadow lines.

FIG. 26 is a sectional view taken perpendicular to FIG. 25 showing a pipe joint with pipe ends together.

FIG. 27 is a view similar to FIG. 26 with the pipe ends spaced apart.

FIG. 28 is a partial axial view showing the positioning of bracket pieces according to FIG. 25.

FIG. 29 is an axial view of a pipe end fitted with a coupling according to FIGS. 25 – 28.

FIG. 30 is a partial axial view of a pipe end fitted with yet another type of coupling according to the invention.

FIG. 31 is a sectional view showing one type of gasket arrangement which may be used with the coupling of FIG. 30.

FIG. 32 is a view similar to FIG. 31 showing a different gasket and coupling arrangement.

FIG. 33 is a detail sectional view of a stab type coupling according to the invention.

FIG. 34 is an axial view of a pipe end fitted with the coupling of FIG. 33 taken in the direction shown by the arrows 34—34 of FIG. 33.

FIG. 35 is a detail view in section and with parts cut away, taken along lines 35—35 of FIG. 33.

FIG. 36 is a sectional view of a rigid form of coupling according to the invention.

FIG. 37 is a view similar to that of FIG. 36 with pipe ends spaced apart.

FIG. 38 is an axial view of channel pieces used in the coupling of FIGS. 36 and 37.

FIG. 39 is a partial axial view of a pipe joint assembly using the coupling of FIGS. 36 and 37.

FIG. 47 is a plan view showing a coupling with separate bridge pieces for use with shouldered pipe.

FIG. 48 is a transverse sectional view of the coupling of FIG. 47.

FIG. 49 is a partial view of a pipe end fitted with the coupling of FIGS. 47 and 48 looking in the direction of arrows 49—49 of FIG. 48.

FIG. 50 is a sectional view illustrating the deficiencies of a prior art grooved pipe joint when pipes of slightly different diameter are jointed.

FIG. 51 is a view similar to FIG. 50 showing a prior art shouldered pipe joint.

FIG. 52 is a view similar to FIGS. 50 and 51 and illustrating the accomodation of pipe tolerances by the stud method of joining pipe of the invention.

FIG. 53 is a plan view of a coupling according to the invention with adjustable bridge pieces.

FIG. 54 is a transverse sectional view taken along lines 54—54 of FIG. 53 and looking in the direction of the ARROWS.

FIG. 55 is a detail view taken perpendicular to that of FIG. 54 with hidden elements shown by shadow lines.

DESCRIPTION OF THE PREFERRED EMBODIMENTS

Figure 40:
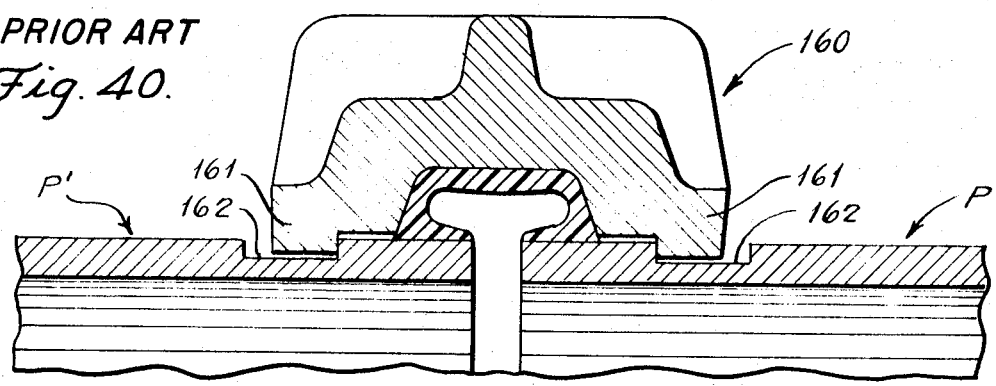
FIG. 40 is a transverse sectional view of a typical prior art coupling key section.

Referring first to FIGS. 1 and 2 of the drawings, showing a basic embodiment of the stud system of joining pipes, it can be seen that a plurality of equally radially spaced studs 10 are secured to the outer surface 11 of a pipe section generally indicated by the reference character P. A coupling generally indicated by the reference numeral 13, encircles the pipe P and encloses the studs 10.

The pipe P, in this basic embodiment, and in the other embodiments to be described, is formed of a suitable metal, as are the studs 10, and the studs are applied at the desired locations by the arc stud welding technique. Stud welding is a known semi-automatic process. A stud is positioned in an applicator and brought into contact with a metal pipe to which the stud is to be attached. The stud itself acts as an electrode and when an electric arc is generated between the stud and the pipe surface the heat generated causes the metal under the arc and a small part of the end of the stud to melt. The applicator then automatically plunges the stud end into the molten area where a complete bonding of the metals forms at once. As shown in FIGS. 1 and 2 the attached stud 10 may have an enlarged base 10a where the weld metal has been pressed outward.

In the sectional view of FIG. 2 the pipe P is shown joined end-to-end with a second pipe P' of equal diameter. The pipe P', like the pipe P, has a plurality of studs 10 affixed around its circumference in a circular array. The coupling 13 encompassing the pipe joint, has a base or web 14 formed with a pair of annular lips 15 extending radially inward toward the pipe surfaces, and an inner pair of annular lips 16 which extend inwardly to form a tapered, channnular seat 17 for a gasket 18. A pair of internal annular channels 19 formed between the lips 15 and 16 on both sides of the gasket seat 17 face the outer surfaces of the pipes P and P' respectively to receive the studs 10 when the pipes have been positioned for joining. The channels 19 may widen slightly near the pipe surfaces to accomodate the widened base portion 10a of the studs.

The channels 19 are deep enough to accomodate the studs 10 when the coupling 13 has been so tightened in place as to compress the gasket 18 against the ends of the pipes P and P' to seal the joint against leakage and to exert the desirable compressive force on the gasket 18. Clearance is provided between the annular channels 19 and the studs to allow for limited longitudinal movement of the pipes and also for angular and rotational movement.

The coupling 13 comprises two semi-annular parts 22 as shown in FIG. 1, so that the coupling may be readily mounted at a pipe joint by placing each half part 22 in position and securing the parts 22 together. In the embodiment of FIG. 1 each coupling half 22 is shown with a pair of integrally formed outwardly projecting bolt pads 23 spaced 180 degrees apart so that the coupling halves 22 may be joined together by a pair of bolts 24 as shown. Of course, separately formed lugs or bolt pads attached to the coupling halves 22 could be substituted for the integral projections 23 if desired. The coupling could comprise more than two arcuate portions, all adapted to be united to form a ring. The bolts 24 or other suitable fasteners must be strong enough to hold the coupling parts together against internal pressure at the pipe joint and to apply sufficient pressure on the gasket 18 for sealing purposes.

Typically the coupling sections 22 may be cast from ductile material such as malleable iron, pearlitic malleable iron, nodular iron or steel. Alternatively roll formed or extruded steel sections, of the correct diameter and arc length could be used, with the bolt pads formed separately and attached to the main sections, for example by welding.

The gasket 18 of the embodiment of FIG. 2 may advantageously be a one-piece ring of natural or synthetic rubber or of other suitable material. The gasket 18 shown in FIG. 2 is channel shaped for flexibility, but in some installations the solid ring gasket 25 shown in FIG. 3 may be preferred. The gasket 25 may be formed of the same materials mentioned in connection with the gasket 18.

FIGS. 2 and 3 show the studs 10 positioned close to the pipe ends, but it might be desirable to locate the studs 10 far enough from the end of the pipe to accomodate the width of the gasket 18 as shown in FIG. 4. With such an arrangement the gasket 18 can simply be placed over one pipe end and slid into its operative central position after the other pipe has been arranged in place. Then the coupling 13 can be applied to join the pipes P and P' together. Tests have shown, however, that suitable gaskets can readily be stretched over the studs and back again, so it is not usually necessary to position the studs 10 back as far from the pipe end as in FIG. 4. Thus it is possible to use a narrower coupling.

The number and size of the studs 10 will, of course, depend on the requirements of the pipe installation. Only the requisite number of studs need to be used so the system need not be over-engineered. The arrangement of studs shown in FIG. 1 is illustrative of a typical arrangement, where the studs are equally spaced around the pipe.

In some cases, an arrangement of studs in angularly spaced groups with the studs of each group relatively close together, may be preferred. Such stud arrangement is illustrated in FIG. 5, where studs are grouped together in groups of four studs at locations spaced generally 90° apart around the circumference of a pipe P.

FIGS. 6 – 9 show a modified coupling arrangement utilizing studs 10 arranged in groups of three studs each, wherein a plurality of separate bridge pieces 26, affixed to an annular channel section 27 at equally angularly spaced locations, span the pipe joint and receive the studs 10 of the angularly spaced stud groups. In the embodiment shown in FIG. 6 the channel section 27 is of two part construction, having two semi-annular half sections which are joined by bolting the half sections together. FIG. 6 shows bolt pads 28 spaced 180 degrees apart on the channel sections 27. The bolts themselves are not shown.

Referring now to FIGS. 7 – 9, the shape and interrelationship of the channel section 27 and the bridge pieces 26 can be seen in three mutually perpendicular views. The bridge piece 26 is formed as a strap or saddle overlying but attached to the channel section 27 by an outwardly extending stud 29.

The stud 29 is welded at its inner end to the base or web 30 of the channel section 27. The shank 33 of the stud 28 passes through a slot 34 provided centrally through a thickened central portion 31 of the bridge piece 26 as best shown in FIGS. 7 and 8. The outer end 35 of the stud 29 is threaded to receive a nut 36 for securing the bridge piece 26 to the channel section 27.

The inner face of the bridge piece 26 is curved as shown in FIG. 9 to match the curvature of the pipe, and each leg 32 of the bridge piece 26 has a set of three recesses 37 for receiving a group of studs 10 welded on each of the pipes to be joined, one stud 10 fitting into each recess 37. Clearance is provided for between the recesses 37 and the studs 10 to allow for longitudinal and angular movement of the pipes P and P'.

The channel section 27 may be of cast construction of the materials mentioned with respect to the coupling 13, or may be of extruded or hot rolled steel channel material which can be cut to length from a long strip or coil, bent to the desired curvature and provided with the bolt pads 28. The bridge pieces 26 may be cast from material of suitable strength, or could be forged or pressed into shape.

A gasket 38, shown fitted within the channel section 27, may be similar to the gasket 18 of FIG. 1 or the gasket 25 of FIG. 3.

In coupling pipes according to the system shown in FIGS. 6 – 9 the pipes to be joined must be aligned and rotated so that the groups of studs on each pipe are opposite each other. The gasket 38 and channel section 27 must be approximately centered between the studs 10 of the opposed pipes, overlying the joint when the pipe ends are brought together, so that the several bridge pieces 26 will receive the studs 10 in their recesses 37. In positioning the channel section 27 the studs 29 must be centered with respect to the stud groupings, so that when a bridge piece 26 is put in place, the stud 29 will pass through the slot 34 of the bridge piece 26 which it secures. It is for this reason that a slot 34 rather than a bolt hole is provided through the bridge piece 26, allowing some leeway in assembly. Suitable templates and fixtures will readily suggest themselves as aids to the necessary alignments.

FIGS. 10-12 show an embodiment of the stud joining system which is basically similar to that of FIGS. 6 - 9 in that separate bridge pieces are used. A channel section 27 of two part construction, halves 27a and 27b of which are joined by means of bolt pads 28, overlies a gasket 38 as in FIGS. 6 - 9. In the construction of FIGS. 10 - 12 however, bridge pieces 41 are welded directly to the channel section 27. Instead of the recesses 37, the bridge pieces 41 have grooves or channels 42 formed in legs 45 thereof for receiving the groups of studs 10. As best shown in FIGS. 10 and 12, one end 43 of the groove or channel 42 is open and the other end 44 is closed. There are only four bridge pieces 41, two welded to each half of the channel section 27, and the open ends 43 of the grooves 42 of the bridge pieces face toward the bolt pads 28. This allows easy sliding assembly of the bridge pieces 41 over the studs 10. The closed ends 44 of the grooves 42 prevent the pipes from excessive relative rotation, which could rotate the studs 10 out from under the bridge pieces 41. Such relative rotation could also occur during assembly if bolts in the bolt pads 28 connecting the channel section halves 27 a & b were unevenly tightened. The coupling arrangement of FIGS. 10 - 12 allows limited longitudinal movement of the joined pipes P and P', since the grooves 42 are wider than the studs 10. Angular motion and limited rotation of the pipes may occur.

Since the bridge pieces 41 in the embodiment of FIGS. 10 - 12 are welded to the channel section 27, they must be of strong, weldable material.

The coupling arrangements of FIGS. 6 - 9 and 10 - 12, as well as the other embodiments to be discussed which utilize separate bridge pieces, have an advantage over the basic embodiment of FIGS. 1 - 3 in that end pull forces on the pipes P and P' are transmitted only through the bridge pieces, and not through the channel sections. Therefore, the channel sections may be of relatively light construction as exemplified by the channel section 27. This feature and other design criteria will be discussed hereafter.

FIGS. 13 - 15 show an embodiment of the stud coupling system utilizing separate bridge pieces 49 and threaded studs 50 which are stud welded to the outer surfaces of pipes P and P' in angularly spaced groups of three studs. The bridge pieces 49 are not welded to the channel section 27, but instead of having recesses or grooves to receive the studs 50, the legs 53 of the bridge pieces 49 are formed with slots 54 therethrough, spaced to match the spacing of the studs 50.

The detail view of FIG. 15 shows the threaded stud 50 in section. Like the studs 10 the stud 50 is adapted to be arc stud welded in place. The outer end 55 of the stud 50 is of reduced diameter, and is threaded to receive a nut 56. A washer 57 underlies the nut 56 and rests on the shoulder 58 where the stud 50 narrows to its reduced diameter. A split pin 59 may be provided to prevent loosening of the nut 56 after it has been threaded on to the stud 50.

In the embodiment of FIGS. 13 - 15 the channel section 27 is centered in place and the bridge pieces 49 receive the threaded ends 55 of the studs 50 through their slots 54. Then the washers 57 and nuts 56 are secured in place. This arrangement allows for limited longitudinal and angular movement of the pipes as the studs 50 move with respect to the slots 54, and could obviously be adapted to allow for some relative rotational motion of the pipes P and P'.

FIGS. 16 - 19 of the drawing illustrate an embodiment of the stud joining system in which mating elements 63 welded to or otherwise joined to arcuate channel sections 64, in a multi-part coupling 62 serve the combined functions of the bridge pieces and bolt pads of the previously discussed embodiments. FIGS. 16 and 17 illustrate the multi-part coupling with four identical 90° arcuate segments, 62'. The coupling segment 62' has an arcuate channel section 64 extending through approximately 90° of arc, and the ends of the section 64 carry symmetrically similar halves of the mating element 63, shown as a right end mating element 63a and a left end mating element 63b. The characters a and b shall be used in describing this embodiment to indicate symmetrically formed portions of the mating elements 63a and 63b. As shown in FIGS. 16 and 17, the element 63a has an outwardly extending bolt pad 65a formed with a bolt hole 66a therethrough. Inwardly extending legs 67a and 68a of the element 63 a embrace the surface of a pipe to be joined. The leg 67a has an inwardly facing groove or recess 70a formed with one open end 71a as shown in FIGS. 16 and 17, and the leg 68a has a similar recess or groove 72a with an open end 73a. When the coupling is positioned to join pipes formed with radially spaced groups of four studs 10 as shown, two of the studs 10 of each group of four studs 10 are received by each groove 70a and 72a. The other two studs 10 of each four stud group are received by the grooves 70b and 72b of the mating element 63b. The open ends 71a and 71b, 73a and 73b of the four grooves facilitate assembly of the coupling 62 on to pipes to be joined.

FIG. 19 shows that the channel section 64 may hold the usual gasket 18. FIG. 18 illustrates the preferred unitary or welded formation of the channel section 64 and mating element 63. An angled bracing portion 75 strengthens the coupling's connection of the bolt pad 65 and channel section 64. As shown in FIGS. 16 - 19 the mating elements 63 combine the functions of bridge pieces and bolt pads in an assembly of preferably integrally formed unitary coupling elements, which are simply bolted together.

The mating sections 63 of the coupling 62 must be strong enough to withstand end pull forces on the coupled pipes, but the rest of the coupling, i.e. the channel section 64, need only withstand internal pressure forces at the pipe joint. The coupling 62 may be of four or more cast arcuate portions, each portion integrally cast with its mating elements 63, or may be fabricated from separate parts as described in connection with the embodiments previously discussed.

Reference is now made to FIGS. 20 - 24, showing a coupling arrangement which is a hybrid of the embodiment shown in FIGS. 16 - 19 with that of FIGS. 6 - 9. The coupling of FIGS. 20 - 24 has the advantage of mating sections 63 which combine the functions of bolt pads and bridge pieces, and also has separate bridge pieces 26 spaced intermediately of the ends of the arcuate channel section 64 in the manner shown in FIGS. 6 - 9. As shown in FIG. 21, the studs 10 in the embodiment of FIGS. 20 - 24 may advantageously be spaced in alternating groups of two and four studs 10 to a group. The separate bridge piece 77 shown in FIGS. 20, 21 and 24 differs somewhat from bridge piece 26 of FIGS. 6 – 9 in that channels 78 are substituted for the recesses 37. Only two studs are received in each channel 78 instead of the three studs in FIGS. 6 – 9, and the bridge piece 77 is shown secured to the channel section 64 by two studs 79 instead of the single stud 29 shown in FIGS. 6 – 9, but these modifications could obviously also be made in the embodiment of FIGS. 6 – 9. The reason the open channels 78 can be used in the embodiment of FIGS. 20 – 24 instead of closed recesses, is that the coupling is secured against relative rotation of the pipes P and P′ in this embodiment.

FIGS. 25 – 29 illustrate a further embodiment of the stud system of joining pipe which utilizes threaded studs 82 which may be basically similar to the threaded stud shown in FIG. 15. In this embodiment, as best illustrated in FIG. 25, the threaded studs 82 are arranged in generally rectangular groups of four. Thus, a pipe with the studs 82 welded on in accordance with FIGS. 25 – 29 shows two parallel circular arrays of studs 82, the studs in each circular array being arcuately spaced in two-stud groups, each stud 82 of each array being aligned with a stud 82 in the other circular array. Each group of four studs 82 serves to secure a right or left bracket piece 83a or 83b respectively, to the pipe.

The bracket pieces 83a and 83b are virtually similar, so only a right bracket 83a will be described. The bracket 83a has a base portion 84a which is generally rectangular in plan as shown best in FIG. 25, the base 84a being curved to lie snugly against the wall of the pipe P. Four holes 85 through the base 84a are arranged in a rectangular grouping to receive the four upstanding studs 82, and nuts 86 secure the bracket 83a to the studs 82. The bracket 83a is preferably positioned back somewhat from the pipe end, and has an upstanding tongue portion 88a at its edge nearest the pipe end. A key or stop 87a extends rearwardly from the end of tongue 88a at one end of the tongue 88a to prevent excessive rotation.

The arrangement of FIGS. 25–29 includes a gasket-receiving channel section 27 to which studs 29 are attached just as in the embodiment of FIGS. 6 – 9. In the embodiment of FIGS. 25–27 however, a pair of upstanding studs 29 are shown extending through slot-like holes 90 formed in a bridge piece 91. The bridge piece 91 is thickened at its central portion 92 so that it will solidly rest on the channel section 27 when the nut on the stud 29 is tightened and has inwardly extending flanges 93 to lie parallel to and cooperate with the tongues 88a and 88b. The flanges 93 will abut the stops 87a and 87b if excess relative rotation of the pipes occurs whether the pipe ends are brought together in the joint as shown in FIG. 27 or spaced apart as shown in FIG. 26. Bolt pads serve to connect parts of channel section 27 as in the other embodiments.

The locations of the stops 87a and 87b alternate as shown in FIGS. 28 and 29. Thus a right bracket 83a and a left bracket 83b are shown in FIG. 28 attached to a pipe end. FIG. 29 shows a pipe joint wherein light of the assemblies of FIGS. 25–27 are employed. In either case the extent of relative rotation is limited by the stops 87 abutting against flanges 93.

Thus the embodiment of FIGS. 25–29 permits some mutual longitudinal and angular motion of the pipes as well as limited relative rotation. The materials for the several parts may be as in some other embodiments discussed above.

The embodiments of the stud coupling system discussed so far in connection with FIGS. 1–29 have all used two-part or multi-part couplings in which the couplings are segmented and may be readily applied or removed radially with respect to the pipes joined. Such coupling arrangements permit an intermediate pipe section to be fitted between two other pipe sections easily. The stud system may also be used in connection with stab-type couplings, in which the main coupling section is formed as a solid ring and pipes P and P′ to be joined must be inserted into the coupling assembly. The embodiments shown in FIGS. 30–35 illustrate the stud system of joining pipes as applied to stabtype coupling.

FIG. 30 shows a view taken axially of a pipe joint in which a continuous metal ring R encircles the ends of pipes P and P′ and encapsulates gasket means (not shown) in a manner to be described in detail in connection with the more specific embodiments of FIGS. 31 and 32. Separate bridge pieces Q overlie the ring R and receive the studs 10 welded to the pipe P in groups of three in accordance with the principles of invention.

FIG. 31 and 32 illustrate different embodiments the stab-type coupling generally illustrated in FIG. 30. Both embodiments would appear as in FIG. 30 if viewed in axial section. When a stab-type coupling is employed, the pipes P and P′ to be joined are preferably tapered at their ends as shown at 97 in FIGS. 31 and 32 for easier insertion into the coupling.

Referring now to FIG. 31 a continuous ring 98 is shown to be channnular in form and to encapsulate a gasket 99 which is particularly suited to a stab-type coupling by its formation which an annular central flange 100 adapted to fit between and separate the ends of the joined pipes.

A bridge piece 101 having a central channel 102 for fitting over the ring 98 and side recesses 103 for receiving the studs 10 is secured in place over the ring 98 by means of threaded studs 104 extending outwardly from the ring 98 to pass through slot like holes 105 formed through the bridge piece. Nuts 106 are threaded on to the studs 104.

FIG. 32 shows an arrangement which is basically similar to that of FIG. 31 but which utilizes a different joint sealing arrangement. In the embodiment of FIG. 32 a continuous circular ring 110 encircles the pipe ends. The ring 110 has two parallel internal annular channels 111 facing the respective surfaces of two joined pipes, each channel 111 receiving a suitable gasket 112 as shown. The channels 111 and gaskets 112 are tapered for easier assembly as shown. The ring 110 has an annular inwardly extending flange 113 adapted to fit between and to separate the ends of joined pipes. Studs 104 attached to the ring 110 seem to secure bridge prices 114 as in the embodiment of FIG. 31.

During assembly of a pipe joint according to FIGS. 30–32 the continuous ring 98 or 110 must be centralized on a pipe so that its connecting studs 104 are positioned as shown in FIG. 30 with respect to the studs 10 on the pipe. The slot-like holes 105 make this alignment somewhat less critical than if round holes were used. Then the other pipe P′ can be stabbed into the ring and the bridge pieces 101 or 114 can be then fitted into place. The central flange 100 of the gasket 99 or the flange 113 of the ring 110 serve to prevent dislocation of the parts when the end of the second pipe P′ is stabbed in. The coupling elements in FIGS. 30–32 may be formed of the materials mentioned as suitable for the other embodiments described.

FIGS. 33–35 illustrate another form of stab-type coupling adapted to connecting pipes to which studs 10 have been secured by arc stud welding. A continuous annular sleeve 115 encircles a pipe joint in the embodiment of FIGS. 33–35, the sleeve 115 being generally U-shaped in cross section as shown in FIG. 33, with a base portion 116 overlying the joint and radially outwardly extending annular lips 117 formed integrally with the base portion 116. The lips 117 may be braced at regular spaced locations by angled rigid web elements 118 for greater strenth. Recesses 121 facing the pipe surfaces for receiving gaskets 122 are formed in the base portion 116 of the sleeve 115 as shown in FIG. 33.

Segmental flanges 123 and 124 which are generally $h$-shaped in cross section cooperate with studs 10 arc-stud welded to the pipes P and P' and with the continuous sleeve 115 to form a stab-type coupling assembly. The flanges 123 and 124 are mutually symmetrical in form, and therefore only the flange 123 will be described.

The flange 123 has an upstanding arcuate lip 125 and a leg portion 126 overlying the surface of the pipe P and enclosing a groove or channel 127 for receiving studs 10 welded to the pipe P. As best shown in FIGS. 34 and 35 the flange 123 extends through an arc of 90 degrees around the pipe P to form a full circle with three other similar segmental flanges 123. At their ends the flanges 123 are formed with integral bolt pads 128 receiving through bolts 129 with nuts 130 for securing the segmental flanges 123 together. Spaced, angled bracing elements 131 integrally formed with the lip 125 and leg portion 126 strengthen the flange 123.

The flange 123 is secured to the lip 117 of the sleeve 115 by means of bolts 135 which receive nuts 137 on their threaded inner ends 136. The bolts 135 pass through aligned holes 138, 139 in the lips 117 and 125 respectively as best shown in FIG. 33. The holes 138 and 139 are of course appropriately formed between the angled brace portions 118 and 131 of the sleeve 115 and flange 123 respectively.

The gaskets 122 used in connection with the embodiment of FIGS. 33–35 are preferably of the pressure responsive type for tightly sealing a pipe joint. In assembling a coupling in accordance with FIGS. 33–35, studs 10 on the pipes P and P' are received within the groove 127 of the segmental flanges 123 and the similar grooves of the flanges 124 and the flange segments are bolted together as shown in FIGS. 34 and 35. Then the sleeve 115 with a gasket 122 is placed on a pipe end, say of pipe P', with holes 138 aligned with holes 139 of the lip 125 and the center sleeve receives the other pipe P by stabbing the pipe P into place. Tightening up on the bolts 135 and the corresponding bolts of the other flange 124 will apply the necessary compression to the rear of the gaskets to effect a tight seal and to prevent gasket blow-out.

The coupling arrangement of FIGS. 33–35 allows limited linear and angular movement of the pipes P and P' and also permits relative rotation of the pipes P and P'. Numerous obvious variations on the structure of the sleeve in this embodiment will suggest themselves. The location and number of studs 10 may also be widely varied in accordance with the desired strength of the joint, etc. the illustrative embodiments of a stab-type coupling are shown and described in detail to show the versatility of the stud system of joining pipes, and its application to still another popular sort of coupling. Known kinds of coupling sleeves may also be adapted to coupling arrangements of the stud system in accordance with the principles of this invention.

A typical embodiment of a rigid pipe joint according to the stud system of this invention is shown in FIGS. 36–39. A rigid joint, as mentioned earlier, is one in which none of the three types of movement — linear angular or rotation — is permitted. In forming such a rigid joint it is generally preferable to bring pipes P and P' into position and to fit a gasket 142 over the joint.

In the embodiment of FIGS. 36–39 channel pieces 143 and 144, each of which is generally semi-circular, are fitted around each pipe and over a plurality of studs 10 arc welded on to each pipe, in accordance with the invention. As shown in FIG. 38 the channel pieces 143 and 144 may have small dowel pins 145 for securing the pieces together to form a complete ring. In FIG. 38 the channel section 143 carries a dowel pin 145 at each of its arcuate ends, and the channel piece 144 is formed at each of its ends with a hole 146 for tightly receiving the dowel pins 145. Some other suitable holding means could of course be used, the purpose of the dowel pins 145 being to retain the channel pieces 143 and 144 in place around the studs 10 while the coupling is assembled.

A main coupling section 147 having a central annular gasket-receiving groove 148 and two spaced annular rectangular grooves 149 for receiving the channel sections 143 and 144 is basically similar to the coupling 13 of FIGS. 1–4. Preferably the coupling section 147 is of two part or multi-part construction, a two part arrangement being shown in FIG. 39, in which bolt pads 150, formed integrally with the coupling parts, are joined by bolts 151 and nuts 152 in a manner similar to that of the embodiment of FIGS. 1–3. By tightening the bolts 151 the main coupling section 147 is tightly secured in place over the channel pieces 143 and 144 and the gasket 142.

Since the embodiment of FIGS. 36–39 is for a rigid joint, tightening means in the form of jacking screws 155 pass through threaded bore holes 156 arranged parallel to the axis of the pipes P and P'. The jacking screws 155 enter the sides of the main coupling section at angularly spaced intervals as shown in FIG. 39 to engage the channel pieces 143 and 144. When the jacking screws are tightened inward they press against the channel pieces 143 and 144, which in turn press against the studs 10 to bring the pipes P and P' together end to end, moving from the position of FIG. 37 to that shown in FIG. 36. In the ordinary case, the ends of the pipes P and P' would be close together at the outset, so that no great degree of tightening of the jacking screws 155 would be necessary. Each jacking screw 155 has a locking nut 157, which is tightened inward against the coupling section 147 after its jacking screw 155 has been tightened as desired to lock the jacking screw 155 position. The degree of tightening of the jacking screws 155 is determined by what forces might act to rotate the pipes P and P'. If it is not necessary to eliminate relative rotational motion the screws 155 need not be tightened very hard, since in that case their only function would be to bring the ends of pipes P and P' together as shown in FIG. 36, thus preventing angular and longitudinal motion.

In the embodiment of FIGS. 36-39 the gasket 142 may be a one-piece gasket as described heretofore, and should be centered at the joint before assembling the coupling. The channel sections 143 and 144 may preferably be formed from extruded, cast or hot rolled metal of sufficient strength, and the main coupling section 147 may be cast with integral bolt pads of formed from separate pieces are described above in connection with other embodiments of the invention.

COMPARISON WITH PRIOR ART

Figure 41:
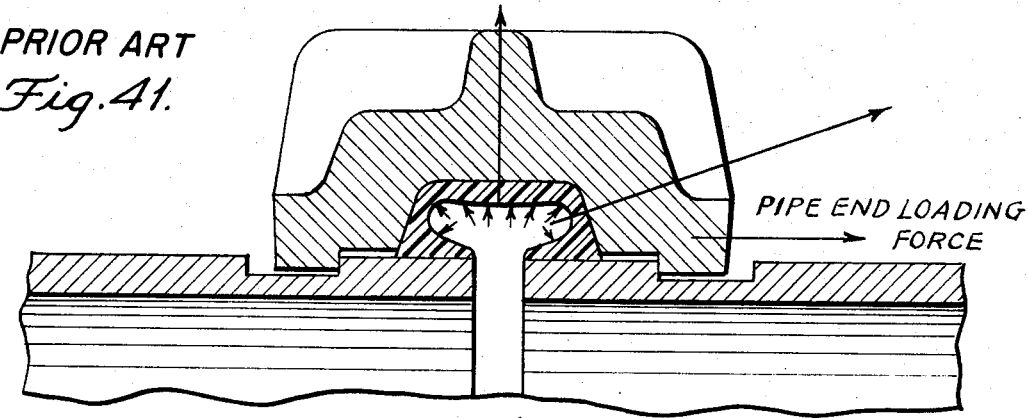
FIG. 41 illustrates the load forces acting on a typical prior art coupling key section.
Figure 42:
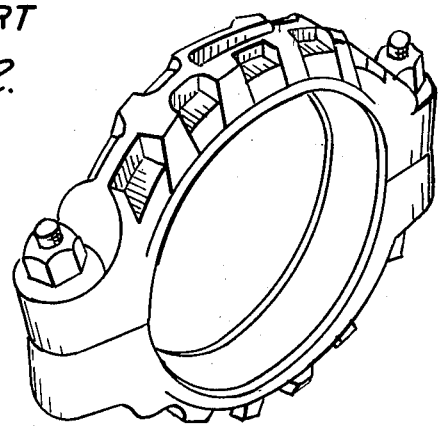
FIG. 42 is a view in perspective of a prior art coupling showing ribs for resisting internal stresses.
Figure 44:
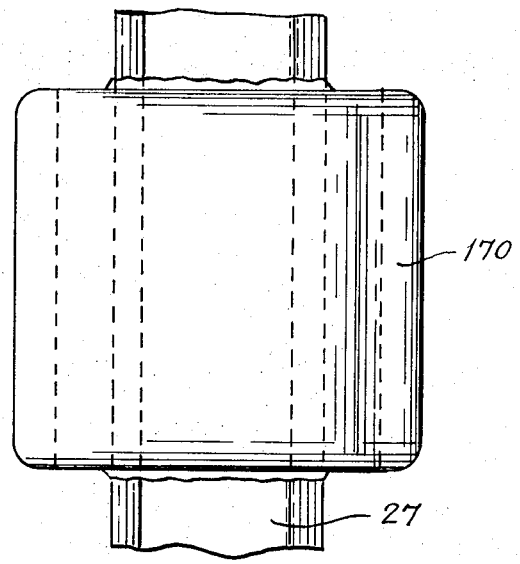
FIG. 44 is a detail plan view of a coupling with separate bridge pieces for grooved pipe.
Figure 45:
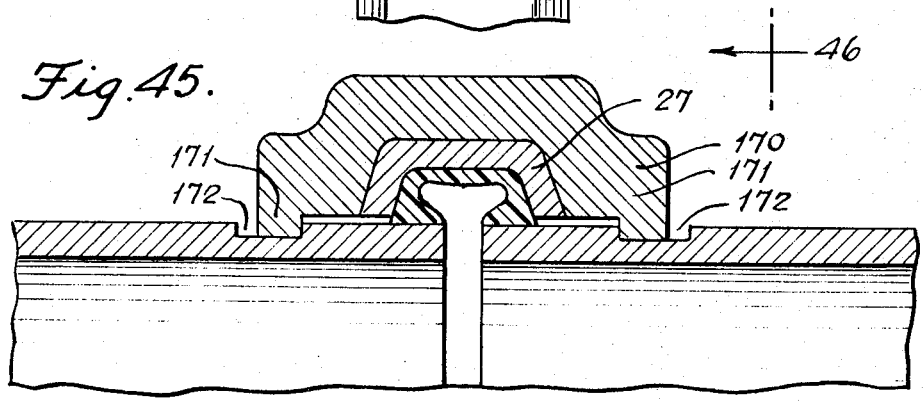
FIG. 45 is a view in transverse section of the coupling shown in FIG. 44.
Figure 46:
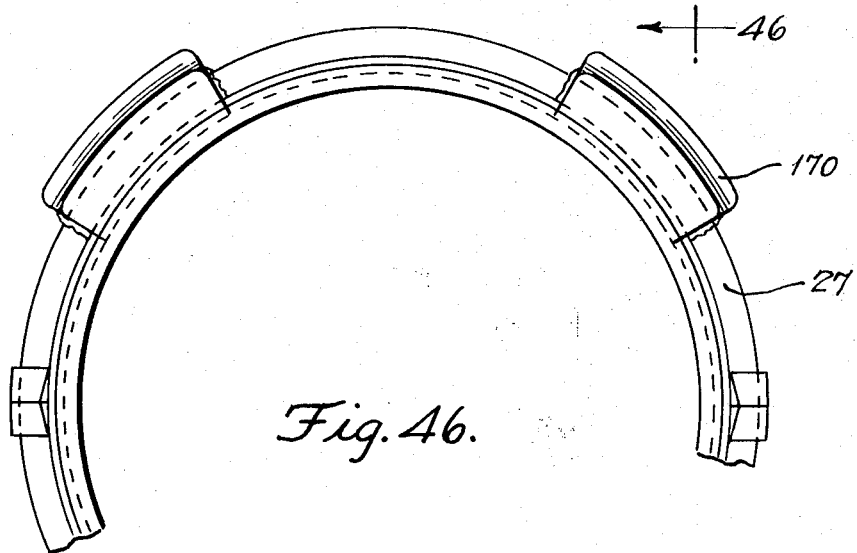
FIG. 46 is an axial view of a coupling with separate bridge pieces taken in the direction indicated by the arrows 46—46 of FIG. 45.

In conventional self-restraining mechanical pipe couplings, as typified by FIGS. 40-42, end loading on a coupling 160 is carried by key sections 161 which extend into grooves 162 formed in the pipe wall. Some disadvantages of such grooved pipes have been set forth in the section "Description of the Prior Art." The forces acting on such a conventional coupling are schematically shown in FIG. 41. It will be apparent that in a plane through any section of the conventional coupling there exist bending stress, shear stress and direct stresses caused by end loading on the pipes as well as the internal pressure transmitted to the coupling. In order to resist such forces conventional couplings have had to be quite bearing. Usually prior art couplings have been ribbed as shown in FIG. 42 to resist the stresses and to make the most economic use of material. Such a ribbed coupling must usually be formed as a casting, preferably in several segments if of a large size.

Figure 43:
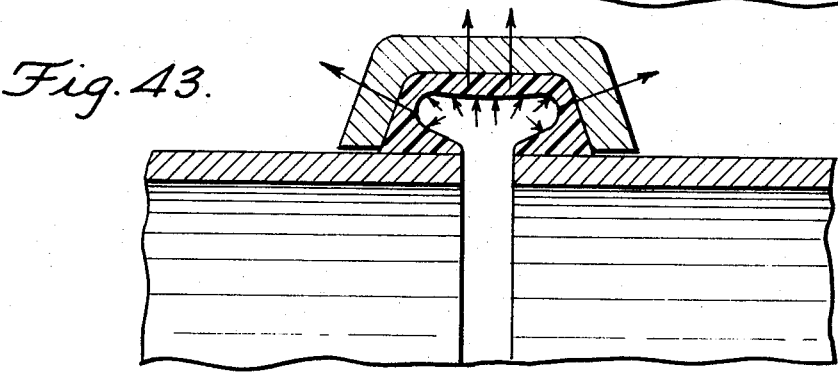
FIG. 43 is a sectional view of a channel section for a coupling according to FIGS. 6–13 showing the distribution of forces acting at the coupling.

In couplings formed according to the stud system, of the present invention, where separate bridge pieces are used as in the preferred embodiments of FIGS. 6 – 15 and others, any end load forces are carried by the separate bridge pieces. The only stress on the coupling itself will be that due to internal pressure, as illustrated in FIG. 43. Consequently a coupling according to the present invention may be of lighter section than prior art designs. In the embodiment of FIGS. 10 – 12 and others where bridge pieces are welded directly to a main channel, the channel is stiffened by the bridge pieces and may be still lighter in section.

Generally speaking, it is preferred that coulings for use with the stud system be of two part rather than multi-part form, though examples of both have been illustrated and described. In a two part coupling circumferential stresses are minimized. Thus a much lighter coupling than the prior art devices may be used.

The principle of using a coupling in which end loading is carried on separate bridge pieces according to the invention may be carried over to couplings for grooved or shouldered pipes as shown in FIGS. 44-49. Although these embodiments do not utilize studs welded to the pipes, they do use couplings with separate bridge pieces in accordance with the invention. Thus in FIGS. 44-46, a coupling is shown with a channel section 27 as in FIGS. 6-12 to which are welded bridge pieces 170 which are basically similar to the bridge pieces 41 of FIGS. 10-12, except that the bridge pieces 170 have key sections 171 for engaging a groove 172 cut into a pipe wall. FIGS. 47-49 illustrate the idea of separate bridge pieces according to the invention extended to a coupling for pipe in which the studs 10 have been replaced by shoulders 180 welded on to the pipe walls. Again the channel section 27 has welded-on bridge pieces 181 which are basically similar to the bridge pieces 41 on FIGS. 10-12. The embodiments of FIGS. 44-49 illustrate the compatibility of the stud system of joining pipes with other systems, since the same general type of mechanical couplings used in the stud system can be used with advantage by adaptation to grooved or shouldered pipe.

FIGS. 50-52 illustrate the superior ability of couplings according to the stud system of the invention to accomodate differences in the outer diameters of pipes to be joined. A fair tolerance is usually allowed in the diameter of pipe sections, and in the past this has resulted in difficulties with prior art coupling systems. In FIGS. 50-52 a pipe section of maximum acceptable outer diameter is indicated by the reference character L and a pipe section of minimum acceptable outer diameter by the reference character S.

Referring first to FIG. 50 it will be seen that the pipe S has a much shallower groove 162a than the groove 162b of the pipe L, as a result of ordinary grooving techniques. The deeper groove 162b tends to weaken the pipe L. The shallower groove 162a gives little purchase to the key section 161 of the coupling 160, and also there is a tendency of the gasket to extrude at 163 where a space is left between the coupling and the pipe S. A deeper key and a reinforced gasket would help in the case of the pipe S, but that would only make the situation worse with respect to the larger pipe L, where the groove 162b is already too deep.

A similar problem would be encountered if there were any difference in the outer diameters of the pipes in FIG. 51, where shouldered pipes are joined by a prior art coupling 160. Consideration of the result of a difference in pipe diameters will show that a deeper key 161 will be needed if any difference in the pipe diameters is present.

These difficulties are readily overcome by the stud system as shown in FIG. 52. Since end pull forces are taken up by the studs 10 and bridge piece 41, there is good engagement even though the pipe L is considerably larger than the pipe S. The gasket is only subjected to internal pressure forces, and is held in place by the channel section 27.

FIGS. 53-55 show a coupling arrangement according to the stud system of the invention which is particularly adapted to situations where there is considerable variation in the diameters of pipes to be joined. Conventional methods of joining pipes could fail completely in such a case. However, the stud system according to the invention makes a much larger tolerance in the outer diameter of pipes acceptable. In the embodiment of FIGS. 53-55 the bridge piece 190 which overlies and is preferably welded to a channel section 27, has adjustable end plates 191 which can be raised or lowered to best engage the studs 10. Adjusting screws 192 threaded into bore holes 193 in the bridge piece 190 pass through slots 194 in the end plates 191. The end plates 191 can be adjusted for best engagement with the studs 10 and then locked in place by tightening the screws 192. Additional screws 195 passing radially through wings 196 of the bridge piece 190 are provided for preventing outward dislodgement of the end plates 191 while in service.

Many variations and modifications of the embodiments disclosed will obviously suggest themselves to those in the art, within the spirit and scope of the stud joining system of the invention. The specific embodiments shown are intended to illustrate the versatility of the invention. What is disclosed is a new and advantageous approach to the joining of pipes utilizing studs welded to the pipes to be joined.

What is claimed is:

1. A pipe joint comprising two pipes, each of said pipes having a plurality of upstanding studs welded to the outer pipe surface at radially spaced positions around the circumference of the pipe, and mechanical coupling means overlying and engaging said studs of both pipes, said mechanical coupling means including an annular coupling element of larger diameter than said pipe, said coupling element having spaced parallel annular channels for receiving the free outer ends of said studs.

2. The pipe joint of claim 1 and including a gasket within said coupling means for sealing the pipe joint against leakage.

3. A pipe joint comprising two pipes, each of said pipes having a plurality of upstanding studs welded to the outer pipe surface at radially spaced positions around the circumference of the pipe, and mechanical coupling means overlying and engaging said studs of both pipes, said coupling means comprising a plurality of arcuate coupling sections having radially outwardly extending end portions secured together by fastening means.

4. A method of joining pipe sections end to end comprising arc welding a plurality pf upstanding studs to the outer surface of pipe sections near the ends of said pipe sections, said studs being at circumferentially radially spaced positions around the pipe sections, positioning the pipe sections with ends to be joined in opposed positions, fitting an annular channel around the opposed ends to enclose a joint between the ends, and securing the pipe sections together by placing a plurality of joint bridging pieces at radially spaced locations around the pipe section ends and securing said bridging pieces with positive fasteners to said channel, each bridging piece overlying the channel and engaging at least one stud on each pipe section whereby end load forces on the pipe sections are carried by the bridging pieces.

5. The method of claim 4 including centering the bridging pieces with respect to studs on both pipe sections.

6. The method of claim 4 wherein said studs are located in spaced groups around the pipe sections and wherein said centering of said bridging pieces includes centering each bridging piece with respect to the middle of a group of studs.

7. The method of claim 4 wherein said fitting of said annular channel comprises stabbing the end of a pipe section into said channel.

8. A pipe joint comprising two pipes, each of said pipes having a plurality of upstanding studs welded to the outer pipe surface at radially spaced positions around the circumference of the pipe, said studs being grouped in radially spaced groups around the pipe circumference, and mechanical coupling means including a generally annular channel section having a web formed on a diameter larger than the diameter of said pipes and legs extending inwardly toward said pipe from said web, said channel section encircling opposed ends of said pipes, said coupling means also including a plurality of bridging elements overlying said annular channel section and secured to said channel section, said bridging elements each overlying and engaging a group of studs welded to each of said pipes said studs being received within corresponding recesses in said bridging elements.

9. The pipe joint of claim 8 wherein said bridging elements are each secured to said channel section by means of a threaded member extending outwardly from said channel section through a corresponding slot in said bridging element and a fastener on said member whereby said bridging elements are individually adjustable with respect to said studs by positioning said bridging elements before tightening said fasteners.

10. The pipe joint of claim 8 wherein said bridging elements are positively secured to said generally annular channel section.

11. The pipe joing of claim 14 wherein said bridging elements are integrally formed with said generally annular channel section, said recesses comprising inwardly facing channels in said bridging pieces for receiving said studs.

12. The pipe joint of claim 8 wherein said generally annular channel section is formed as an integral ring.

13. The pipe joint of claim 8 wherein said generally annular channel section is formed of a plurality of arcuate sections.

14. A method of joining pipe sections end to end comprising arc welding a plurality of upstanding studs to the outer surfaces of said pipe sections at radially spaced positions around said pipe sections, positioning a generally annular coupling around the ends of both pipe sections, and securing said pipes against separation by placing opposed members over the studs on each of said pipe sections and securing said opposed members to said generally annular coupling.

15. The method joint claim 14 including locating said opposed members symetrically with respect to a plane bisecting said generally annular coupling.

16. The method of claim 14 including positively securing said opposed members to said studs.

17. An end-to-end pipe joint comprising two pipes, each of said pipes having a plurality of upstanding studs welded to the outer pipe surface at radially spaced positions around the circumference of the pipe, and mechanical coupling means including a generally annular coupling member encircling opposed ends of said pipes, a pair of opposed members, one of said opposed members engaging the studs of each of said pipes, and means securing the opposed members to said generally annular coupling.

18. The pipe joint of claim 17 wherein said generally annular coupling includes a channel section encircling the pipe joint and the means securing said coupling to said opposed members includes a plurality of bridge elements secured to said channel and engaging said opposed members.

19. The joint of claim 17 wherein each opposed member has a groove receiving the studs and said generally annular coupling is an integrally formed sleeve-like member.

* * * * *

UNITED STATES PATENT OFFICE
CERTIFICATE OF CORRECTION

Patent No. 3,756,629      Dated September 4, 1973

Inventor(s) John Gibb

It is certified that error appears in the above-identified patent and that said Letters Patent are hereby corrected as shown below:

In Claim 4,   line 2,   "pf" should read --of--.

In Claim 11,  line 1,   "joing" should read --joint--;

"Claim 14" should read --Claim 8--.

In Claim 15,  line 1,   "joint" should read --of--.

Signed and sealed this 9th day of April 1974.

(SEAL)
Attest:

EDWARD M. FLETCHER, JR.
Attesting Officer

C. MARSHALL DANN
Commissioner of Patents